(12) United States Patent
Wu et al.

(10) Patent No.: US 11,646,848 B2
(45) Date of Patent: May 9, 2023

(54) TECHNIQUES FOR TRANSMITTING SIDELINK HARQ FEEDBACK

(71) Applicant: QUALCOMM Incorporated, San Diego, CA (US)

(72) Inventors: Shuanshuan Wu, San Diego, CA (US); Sudhir Kumar Baghel, Hillsborough, NJ (US); Kapil Gulati, Hillsborough, NJ (US); Tien Viet Nguyen, Bridgewater, NJ (US); Arjun Bharadwaj, Cupertino, CA (US)

(73) Assignee: QUALCOMM Incorporated, San Diego, CA (US)

( * ) Notice: Subject to any disclaimer, the term of this patent is extended or adjusted under 35 U.S.C. 154(b) by 86 days.

(21) Appl. No.: 16/883,371

(22) Filed: May 26, 2020

(65) Prior Publication Data

US 2020/0412508 A1    Dec. 31, 2020

Related U.S. Application Data

(60) Provisional application No. 62/867,777, filed on Jun. 27, 2019.

(51) Int. Cl.
| | |
|---|---|
| *H04L 5/00* | (2006.01) |
| *H04W 28/04* | (2009.01) |
| *H04W 92/18* | (2009.01) |

(52) U.S. Cl.
CPC .......... *H04L 5/0055* (2013.01); *H04L 5/0023* (2013.01); *H04W 28/04* (2013.01); *H04W 92/18* (2013.01)

(58) Field of Classification Search
CPC ... H04L 5/0055; H04L 5/0023; H04L 1/1861; H04L 1/1854; H04W 28/04; H04W 92/18
USPC ........................................................ 370/330
See application file for complete search history.

(56) References Cited

U.S. PATENT DOCUMENTS

| | | | |
|---|---|---|---|
| 2012/0140698 A1* | 6/2012 | Noh | H04B 7/15507 370/315 |
| 2020/0029318 A1* | 1/2020 | Guo | H04W 72/042 |
| 2020/0037343 A1* | 1/2020 | He | H04W 72/0446 |
| 2020/0112400 A1* | 4/2020 | Lee | H04W 72/0473 |

(Continued)

OTHER PUBLICATIONS

Huawei, "Sidelink physical layer structure for NR V2X", R1-1906007, May 13-17, 2019. (From Applicant's IDS) (Year: 2019).*

(Continued)

*Primary Examiner* — Mang Hang Yeung
(74) *Attorney, Agent, or Firm* — Dalei Dong; Harrity & Harrity, LLP

(57) ABSTRACT

Various aspects of the present disclosure generally relate to wireless communication. In some aspects, a user equipment may determine hybrid automatic repeat request (HARQ) feedback for one or more sidelink communications received from one or more other UEs. The UE may identify one or more sets of subcarriers of a HARQ feedback occasion for the HARQ feedback for the one or more sidelink communications. The UE may transmit, to the one or more other UEs and on a sidelink, the HARQ feedback for the one or more sidelink communications using the one or more sets of subcarriers of the HARQ feedback occasion. Numerous other aspects are provided.

30 Claims, 11 Drawing Sheets

(56) References Cited

U.S. PATENT DOCUMENTS

2020/0344722 A1* 10/2020 He .................. H04W 72/02
2022/0232520 A1* 7/2022 Yoshioka .............. H04L 1/1854

OTHER PUBLICATIONS

Intel Corporation, "Sidelink Physical Structure for NR V2X Communication", R1-1906794, May 13-17, 2019 (From Applicant's IDS) (Year: 2019).*

Huawei, et al., "Sidelink Physical Layer Structure for NR V2X", 3GPP Draft, 3GPP TSG RAN WG1 Meeting #97, R1-1906007, 3rd Generation Partnership Project (3GPP), Mobile Competence Centre, 650, Route Des Lucioles, F-06921 Sophia-Antipolis Cedex, France, vol. RAN WG1, No. Reno, USA, May 13, 2019-May 17, 2019, May 13, 2019 (May 13, 2019), XP051727464, 17 pages.

Intel Corporation: "Sidelink Physical Structure for NR V2X Communication", 3GPP Draft, 3GPP TSG RAN WG1 Meeting #97, R1-1906794, Intel—EV2X SL L1, 3rd Generation Partnership Project (3GPP), Mobile Competence Centre, 650, Route Des Lucioles, F-06921 Sophia-Antipolis Cedex, France, vol. RAN WG1, No. Reno, USA, May 13, 2019-May 17, 2019, May 13, 2019 (May 13, 2019), XP051728245, pp. 1-20.

Huawei, et al., "Sidelink Physical Layer Structure for Nr V2X", 3GPP Draft, 3GPP Tsg Ran WG1 Meeting #97, R1-1906007, 3rd Generation Partnership Project (3GPP), Mobile Competence Centre, 650, Route Des Lucioles, F-06921 Sophia-Antipolis Cedex, France, vol. Ran WG1, No. Reno, USA, 20190513-20190517, May 13, 2019 (2019-05-13), XP051727464, 17 p. Retrieved from the Internet: URL: http://www.3gpp.org/ftp/Meetings%5F3GPP%5FSYNC/RAN1/Docs/R1%2D1906007%2Ezip. [retrieved on 2019-05-13] p. 1-2. section 1. Fig. 1-2 p. 5. section 2.5 p. 7. section 4.1.1. Figure 6 p. 7. blw. Proposal 10 p. 12. Fig. 8 and below p. 15. par. above Fig. 10.

Intel Corporation: "Sidelink Physical Structure for Nr V2X Communication", 3GPP Draft, 3GPP TSG RAN WG1 Meeting #97, R1-1906794, Intel—EV2X Sl L1, 3rd Generation Partnership Project (3GPP), Mobile Competence Centre, 650, Route Des Lucioles, F-06921 Sophia-Antipolis Cedex, France, vol. Ran WG1, No. Reno, USA, May 13, 2019-May 17, 2019, May 13, 2019 (May 13, 2019), XP051728245, pp. 1-20, Retrieved from the Internet: URL: http://www.3gpp.org/ftp/Meetings%5F3GPP%5FSYNC/RAN1/Docs/R1%2D1906794%2Ezip. [retrieved on May 13, 2019] p. 13, the whole document.

International Search Report and Written Opinion—PCT/US2020/034700—ISA/EPO—dated Nov. 4, 2020.

Partial International Search Report—PCT/US2020/034700—ISA/EPO—dated Sep. 10, 2020.

* cited by examiner

TECHNIQUES FOR TRANSMITTING SIDELINK HARQ FEEDBACK

CROSS-REFERENCE TO RELATED APPLICATION

This application claims priority to U.S. Provisional Patent Application No. 62/867,777, filed on Jun. 27, 2019, entitled "TECHNIQUES FOR TRANSMITTING SIDELINK HARQ FEEDBACK," which is hereby expressly incorporated by reference herein.

FIELD OF THE DISCLOSURE

Aspects of the present disclosure generally relate to wireless communication and to techniques for transmitting sidelink hybrid automatic repeat request (HARQ) feedback.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include determining hybrid automatic repeat request (HARQ) feedback for one or more sidelink communications received from one or more other UEs; identifying one or more sets of subcarriers of a HARQ feedback occasion for the HARQ feedback for the one or more sidelink communications; and transmitting, to the one or more other UEs and on a sidelink, the HARQ feedback for the one or more sidelink communications using the one or more sets of subcarriers of the HARQ feedback occasion.

In a first aspect, each set of subcarriers, of the one or more sets of subcarriers, is associated with a respective HARQ feedback for a sidelink communication of the HARQ feedback for the one or more sidelink communications, and each set of subcarriers, of the one or more sets of subcarriers, includes a plurality of subcarriers. In a second aspect, alone or in combination with the first aspect, the plurality of subcarriers are non-contiguous and evenly spaced apart across a bandwidth for the HARQ feedback occasion. In a third aspect, alone or in combination with one or more of the first and second aspects, the plurality of subcarriers are non-contiguous and each spaced apart by a particular number of subcarriers.

In a fourth aspect, alone or in combination with one or more of the first through third aspects, the plurality of subcarriers are non-contiguous and each spaced apart by a number of subcarriers, and the number of subcarriers is based at least in part on at least one of a subcarrier spacing of the sidelink, a bandwidth of the sidelink, a number of subchannels included in the bandwidth of the sidelink, a number of resource blocks included in the bandwidth of the sidelink, or a periodicity of HARQ feedback occasions for the sidelink. In a fifth aspect, alone or in combination with one or more of the first through fourth aspects, the plurality of subcarriers are non-contiguous, and a number of the one or more sets of subcarriers is based at least in part on a spacing between the plurality of subcarriers.

In a sixth aspect, alone or in combination with one or more of the first through fifth aspects, the plurality of subcarriers includes a plurality of non-contiguous groups of contiguous subcarriers. In a seventh aspect, alone or in combination with one or more of the first through sixth aspects, the plurality of non-contiguous groups are each spaced apart by a particular number of subcarriers. In an eighth aspect, alone or in combination with one or more of the first through seventh aspects, the plurality of non-contiguous groups are each spaced apart by a number of subcarriers, and the number of subcarriers is based at least in part on at least one of a subcarrier spacing of the sidelink, a bandwidth of the sidelink, a number of subchannels included in the bandwidth of the sidelink, a number of resource blocks included in the bandwidth of the sidelink, or a periodicity of HARQ feedback occasions for the sidelink.

In a ninth aspect, alone or in combination with one or more of the first through eighth aspects, a number of the one or more sets of subcarriers is based at least in part on a spacing between the plurality of non-contiguous groups of contiguous subcarriers. In a tenth aspect, alone or in combination with one or more of the first through ninth aspects, each set of subcarriers, of the one or more sets of subcarriers, is associated with a respective HARQ feedback for a sidelink communication of the HARQ feedback for the one or more sidelink communications; each set of subcarriers, of the one or more sets of subcarriers, includes an exclusive plurality of subcarriers; and the one or more sets of subcarriers are frequency division multiplexed. In an eleventh aspect, alone or in combination with one or more of the first through tenth aspects, transmitting the HARQ feedback for the one or more sidelink communications comprises transmitting one or more sequences that indicate the HARQ feedback for the one or more sidelink communications.

In a twelfth aspect, alone or in combination with one or more of the first through eleventh aspects, a length of the one or more sequences is based at least in part on at least one of a modulation order of one or more HARQ feedback communications for the HARQ feedback for the one or more sidelink communications, a bandwidth of the HARQ feedback occasion, a bandwidth of the one or more HARQ feedback communications, or a spacing between respective pluralities of subcarriers included in the one or more sets of subcarriers. In a thirteenth aspect, alone or in combination with one or more of the first through twelfth aspects, the method further comprises generating a sequence of the one or more sequences based at least in part on at least one of a UE identifier associated with another UE, of the one or more other UEs, that transmitted a sidelink communication, of the one or more sidelink communications, associated with the sequence, a sidelink channel resource identifier associated with the sidelink communication, a frame identifier associated with the sidelink communication, a slot number associated with the sidelink communication, or a symbol number associated with the sidelink communication.

In a fourteenth aspect, alone or in combination with one or more of the first through thirteenth aspects, the method further comprises modulating the one or more sequences based at least in part on a quadrature amplitude modulation (QAM) modulation order. In a fifteenth aspect, alone or in combination with one or more of the first through fourteenth aspects, a time duration of the HARQ feedback occasion includes a plurality of symbols, and transmitting the one or more sequences comprises transmitting a sequence, of the one or more sequences, in each symbol of the plurality of symbols. In a sixteenth aspect, alone or in combination with one or more of the first through fifteenth aspects, transmitting the HARQ feedback for the one or more sidelink communications comprises transmitting a plurality of sequences that indicate a HARQ feedback for a sidelink communication of the one or more sidelink communications, where a time duration of the HARQ feedback occasion includes a plurality of symbols, and transmitting the plurality of sequences that indicate the HARQ feedback for the sidelink communication comprises transmitting each sequence, of the plurality of sequences, in a respective symbol of the plurality of symbols, each sequence, of the plurality of sequences, being a different sequence of the plurality of sequences.

In a seventeenth aspect, alone or in combination with one or more of the first through sixteenth aspects, determining the HARQ feedback for the one or more sidelink communications comprises determining, for a sidelink communication of the one or more sidelink communications, whether to transmit a NACK. In an eighteenth aspect, alone or in combination with one or more of the first through seventeenth aspects, transmitting the one or more sequences that indicate the HARQ feedback for the one or more sidelink communications comprises transmitting a pseudorandom noise (PN) sequence, of the one or more sequences, that indicates the NACK. In a nineteenth aspect, alone or in combination with one or more of the first through eighteenth aspects, the method further comprises initializing a seed sequence based at least in part on determining to transmit the NACK and generating the PN sequence based at least in part on the seed sequence. In a twentieth aspect, alone or in combination with one or more of the first through nineteenth aspects, the method further comprises generating the PN sequence; and applying an orthogonal cover code (OCC) or cyclic shift that is based at least in part on determining to transmit the NACK. In a twenty first aspect, alone or in combination with one or more of the first through twentieth aspects, determining the HARQ feedback for the one or more sidelink communications comprises determining, for a sidelink communication of the one or more sidelink communications, whether to transmit a NACK or an ACK. In a twenty second aspect, alone or in combination with one or more of the first through twenty first aspects, transmitting the one or more sequences that indicate the HARQ feedback for the one or more sidelink communications comprises transmitting a PN sequence, of the one or more sequences that indicates the NACK or the ACK.

In a twenty third aspect, alone or in combination with one or more of the first through twenty second aspects, the method further comprises initializing a seed sequence based at least in part on determining whether to transmit the NACK or the ACK, and generating the PN sequence based at least in part on the seed sequence. In a twenty fourth aspect, alone or in combination with one or more of the first through twenty third aspects, the method further comprises generating the PN sequence and applying an OCC or cyclic shift that is based at least in part on determining whether to transmit the NACK or the ACK.

In a twenty fifth aspect, alone or in combination with one or more of the first through twenty fourth aspects, the method further comprises generating the PN sequence based at least in part on a UE identifier associated with another UE, of the one or more other UEs, that transmitted the sidelink communication. In a twenty sixth aspect, alone or in combination with one or more of the first through twenty fifth aspects, transmitting the HARQ feedback for the one or more sidelink communications comprises transmitting the HARQ feedback for the one or more sidelink communications using a transmit power that is based at least in part on a number of HARQ feedback communications for the HARQ feedback for the one or more sidelink communications and a maximum number of HARQ feedback communications permitted to be transmitted in the HARQ feedback occasion.

In a twenty seventh aspect, alone or in combination with one or more of the first through twenty sixth aspects, the method further comprises identifying the HARQ feedback occasion from a plurality of periodic HARQ feedback occasions based at least in part on a time-domain resource location of the one or more sidelink communications, and a HARQ feedback delay parameter. In a twenty eighth aspect, alone or in combination with one or more of the first through twenty seventh aspects, identifying the one or more sets of subcarriers comprises identifying a set of subcarriers of the one or more sets of subcarriers based at least in part on a subchannel, of the sidelink, in which a sidelink communication of the one or more sidelink communications was transmitted.

In a twenty ninth aspect, alone or in combination with one or more of the first through twenty eighth aspects, a sidelink communication, of the one or more sidelink communications, is transmitted across a plurality of slots, and the method further comprises identifying the HARQ feedback occasion based at least in part on an ending slot of the plurality of slots, and identifying the one or more sets of subcarriers comprises identifying a set of subcarriers of the one or more sets of subcarriers based at least in part on a starting slot or an ending of the plurality of slots. In a thirtieth aspect, alone or in combination with one or more of the first through twenty ninth aspects, the method includes receiving the one or more sidelink communications using an unlicensed frequency spectrum, and wherein transmitting the HARQ feedback comprises transmitting the HARQ feedback using the unlicensed frequency spectrum.

In some aspects, a UE for wireless communication may include memory and one or more processors operatively coupled to the memory. The memory and the one or more processors may be configured to determine HARQ feedback for one or more sidelink communications received from one or more other UEs; identify one or more sets of subcarriers of a HARQ feedback occasion for the HARQ feedback for the one or more sidelink communications; and transmit, to the one or more other UEs and on a sidelink, the HARQ feedback for the one or more sidelink communications using the one or more sets of subcarriers of the HARQ feedback occasion.

In a first aspect, each set of subcarriers, of the one or more sets of subcarriers, is associated with a respective HARQ feedback for a sidelink communication of the HARQ feedback for the one or more sidelink communications, and each set of subcarriers, of the one or more sets of subcarriers, includes a plurality of subcarriers. In a second aspect, alone or in combination with the first aspect, the plurality of subcarriers are non-contiguous and evenly spaced apart across a bandwidth for the HARQ feedback occasion. In a third aspect, alone or in combination with one or more of the first and second aspects, the plurality of subcarriers are non-contiguous and each spaced apart by a particular number of subcarriers.

In a fourth aspect, alone or in combination with one or more of the first through third aspects, the plurality of subcarriers are non-contiguous and each spaced apart by a number of subcarriers, and the number of subcarriers is based at least in part on at least one of a subcarrier spacing of the sidelink, a bandwidth of the sidelink, a number of subchannels included in the bandwidth of the sidelink, a number of resource blocks included in the bandwidth of the sidelink, or a periodicity of HARQ feedback occasions for the sidelink. In a fifth aspect, alone or in combination with one or more of the first through fourth aspects, the plurality of subcarriers are non-contiguous, and a number of the one or more sets of subcarriers is based at least in part on a spacing between the plurality of subcarriers.

In a sixth aspect, alone or in combination with one or more of the first through fifth aspects, the plurality of subcarriers includes a plurality of non-contiguous groups of contiguous subcarriers. In a seventh aspect, alone or in combination with one or more of the first through sixth aspects, the plurality of non-contiguous groups are each spaced apart by a particular number of subcarriers. In an eighth aspect, alone or in combination with one or more of the first through seventh aspects, the plurality of non-contiguous groups are each spaced apart by a number of subcarriers, and the number of subcarriers is based at least in part on at least one of a subcarrier spacing of the sidelink, a bandwidth of the sidelink, a number of subchannels included in the bandwidth of the sidelink, a number of resource blocks included in the bandwidth of the sidelink, or a periodicity of HARQ feedback occasions for the sidelink.

In a ninth aspect, alone or in combination with one or more of the first through eighth aspects, a number of the one or more sets of subcarriers is based at least in part on a spacing between the plurality of non-contiguous groups of contiguous subcarriers. In a tenth aspect, alone or in combination with one or more of the first through ninth aspects, each set of subcarriers, of the one or more sets of subcarriers, is associated with a respective HARQ feedback for a sidelink communication of the HARQ feedback for the one or more sidelink communications, each set of subcarriers, of the one or more sets of subcarriers, includes an exclusive plurality of subcarriers, and the one or more sets of subcarriers are frequency division multiplexed. In an eleventh aspect, alone or in combination with one or more of the first through tenth aspects, the one or more processors, when transmitting the HARQ feedback for the one or more sidelink communications, are configured to transmit one or more sequences that indicate the HARQ feedback for the one or more sidelink communications.

In a twelfth aspect, alone or in combination with one or more of the first through eleventh aspects, a length of the one or more sequences is based at least in part on at least one of a modulation order of one or more HARQ feedback communications for the HARQ feedback for the one or more sidelink communications, a bandwidth of the HARQ feedback occasion, a bandwidth of the one or more HARQ feedback communications, or a spacing between respective pluralities of subcarriers included in the one or more sets of subcarriers. In a thirteenth aspect, alone or in combination with one or more of the first through twelfth aspects, the one or more processors are further configured to generate a sequence of the one or more sequences based at least in part on at least one of a UE identifier associated with another UE, of the one or more other UEs, that transmitted a sidelink communication, of the one or more sidelink communications, associated with the sequence, a sidelink channel resource identifier associated with the sidelink communication, a frame identifier associated with the sidelink communication, a slot number associated with the sidelink communication, or a symbol number associated with the sidelink communication.

In a fourteenth aspect, alone or in combination with one or more of the first through thirteenth aspects, the one or more processors are further configured to modulate the one or more sequences based at least in part on a QAM modulation order. In a fifteenth aspect, alone or in combination with one or more of the first through fourteenth aspects, a time duration of the HARQ feedback occasion includes a plurality of symbols, and the one or more processors, when transmitting the one or more sequences, are configured to transmit a sequence, of the one or more sequences, in each symbol of the plurality of symbols. In a sixteenth aspect, alone or in combination with one or more of the first through fifteenth aspects, the one or more processors, when transmitting the HARQ feedback for the one or more sidelink communications, are configured to transmit a plurality of sequences that indicate a HARQ feedback for a sidelink communication of the one or more sidelink communications, a time duration of the HARQ feedback occasion includes a plurality of symbols, and transmit the plurality of sequences that indicate the HARQ feedback for the sidelink communication comprises transmitting each sequence, of the plurality of sequences, in a respective symbol of the plurality of symbols, each sequence, of the plurality of sequences, being a different sequence of the plurality of sequences.

In a seventeenth aspect, alone or in combination with one or more of the first through sixteenth aspects, the one or more processors, when determining the HARQ feedback for the one or more sidelink communications, are configured to determine, for a sidelink communication of the one or more sidelink communications, whether to transmit a NACK. In an eighteenth aspect, alone or in combination with one or more of the first through seventeenth aspects, the one or more processors, when transmitting the one or more sequences that indicate the HARQ feedback for the one or more sidelink communications, are configured to transmit a PN sequence, of the one or more sequences, that indicates the NACK. In a nineteenth aspect, alone or in combination with one or more of the first through eighteenth aspects, the one or more processors are further configured to initialize a seed sequence based at least in part on determining to transmit the NACK and generating the PN sequence based at least in part on the seed sequence. In a twentieth aspect, alone or in combination with one or more of the first through nineteenth aspects, the one or more processors are further configured to generate the PN sequence; and apply an OCC or cyclic shift that is based at least in part on determining to transmit the NACK. In a twenty first aspect, alone or in combination with one or more of the first through twentieth aspects, the one or more processors, when determining the HARQ feedback for the one or more sidelink communications, are configured to determine, for a sidelink communication of the one or more sidelink communications, whether to transmit a NACK or an ACK. In a twenty second aspect, alone or in combination with one or more of the first through twenty first aspects, the one or more processors, when transmitting the one or more sequences that indicate the HARQ feedback for the one or more sidelink communications, are configured to transmit a PN sequence, of the one or more sequences that indicates the NACK or the ACK.

In a twenty third aspect, alone or in combination with one or more of the first through twenty second aspects, the one or more processors are further configured to initialize a seed sequence based at least in part on determining whether to transmit the NACK or the ACK, and generate the PN sequence based at least in part on the seed sequence. In a twenty fourth aspect, alone or in combination with one or more of the first through twenty third aspects, the one or more processors are further configured to generate the PN sequence and applying an OCC or cyclic shift that is based at least in part on determining whether to transmit the NACK or the ACK.

In a twenty fifth aspect, alone or in combination with one or more of the first through twenty fourth aspects, the one or more processors are further configured to generate the PN sequence based at least in part on a UE identifier associated with another UE, of the one or more other UEs, that transmitted the sidelink communication. In a twenty sixth aspect, alone or in combination with one or more of the first through twenty fifth aspects, the one or more processors, when transmitting the HARQ feedback for the one or more sidelink communications, are configured to transmit the HARQ feedback for the one or more sidelink communications using a transmit power that is based at least in part on a number of HARQ feedback communications for the HARQ feedback for the one or more sidelink communications and a maximum number of HARQ feedback communications permitted to be transmitted in the HARQ feedback occasion.

In a twenty seventh aspect, alone or in combination with one or more of the first through twenty sixth aspects, the one or more processors are further configured to identify the HARQ feedback occasion from a plurality of periodic HARQ feedback occasions based at least in part on a time-domain resource location of the one or more sidelink communications, and a HARQ feedback delay parameter. In a twenty eighth aspect, alone or in combination with one or more of the first through twenty seventh aspects, the one or more processors, when identifying the one or more sets of subcarriers, are configured to identify a set of subcarriers of the one or more sets of subcarriers based at least in part on a subchannel, of the sidelink, in which a sidelink communication of the one or more sidelink communications was transmitted.

In a twenty ninth aspect, alone or in combination with one or more of the first through twenty eighth aspects, a sidelink communication, of the one or more sidelink communications, is transmitted across a plurality of slots, and the one or more processors are further configured to identify the HARQ feedback occasion based at least in part on an ending slot of the plurality of slots, and the one or more processors, when identifying the one or more sets of subcarriers, are configured to identify a set of subcarriers of the one or more sets of subcarriers based at least in part on a starting slot or an ending of the plurality of slots. In a thirtieth aspect, alone or in combination with one or more of the first through twenty ninth aspects, the one or more processors are further configured to receive the one or more sidelink communications using an unlicensed frequency spectrum, and wherein the one or more processors, when transmitting the HARQ feedback, are configured to transmit the HARQ feedback using the unlicensed frequency spectrum.

In some aspects, a non-transitory computer-readable medium may store one or more instructions for wireless communication. The one or more instructions, when executed by one or more processors of a UE, may cause the one or more processors to: determine HARQ feedback for one or more sidelink communications received from one or more other UEs; identify one or more sets of subcarriers of a HARQ feedback occasion for the HARQ feedback for the one or more sidelink communications; and transmit, to the one or more other UEs and on a sidelink, the HARQ feedback for the one or more sidelink communications using the one or more sets of subcarriers of the HARQ feedback occasion.

In a first aspect, each set of subcarriers, of the one or more sets of subcarriers, is associated with a respective HARQ feedback for a sidelink communication of the HARQ feedback for the one or more sidelink communications, and each set of subcarriers, of the one or more sets of subcarriers, includes a plurality of subcarriers. In a second aspect, alone or in combination with the first aspect, the plurality of subcarriers are non-contiguous and evenly spaced apart across a bandwidth for the HARQ feedback occasion. In a third aspect, alone or in combination with one or more of the first and second aspects, the plurality of subcarriers are non-contiguous and each spaced apart by a particular number of subcarriers.

In a fourth aspect, alone or in combination with one or more of the first through third aspects, the plurality of subcarriers are non-contiguous and each spaced apart by a number of subcarriers, and the number of subcarriers is based at least in part on at least one of a subcarrier spacing of the sidelink, a bandwidth of the sidelink, a number of subchannels included in the bandwidth of the sidelink, a number of resource blocks included in the bandwidth of the sidelink, or a periodicity of HARQ feedback occasions for the sidelink. In a fifth aspect, alone or in combination with one or more of the first through fourth aspects, the plurality of subcarriers are non-contiguous, and a number of the one or more sets of subcarriers is based at least in part on a spacing between the plurality of subcarriers.

In a sixth aspect, alone or in combination with one or more of the first through fifth aspects, the plurality of subcarriers includes a plurality of non-contiguous groups of contiguous subcarriers. In a seventh aspect, alone or in combination with one or more of the first through sixth aspects, the plurality of non-contiguous groups are each spaced apart by a particular number of subcarriers. In an eighth aspect, alone or in combination with one or more of the first through seventh aspects, the plurality of non-contiguous groups are each spaced apart by a number of subcarriers, and the number of subcarriers is based at least in part on at least one of a subcarrier spacing of the sidelink, a bandwidth of the sidelink, a number of subchannels included in the bandwidth of the sidelink, a number of resource blocks included in the bandwidth of the sidelink, or a periodicity of HARQ feedback occasions for the sidelink.

In a ninth aspect, alone or in combination with one or more of the first through eighth aspects, a number of the one or more sets of subcarriers is based at least in part on a spacing between the plurality of non-contiguous groups of contiguous subcarriers. In a tenth aspect, alone or in combination with one or more of the first through ninth aspects, each set of subcarriers, of the one or more sets of subcarriers, is associated with a respective HARQ feedback for a sidelink communication of the HARQ feedback for the one or more sidelink communications, each set of subcarriers, of the one or more sets of subcarriers, includes an exclusive plurality of subcarriers, and the one or more sets of subcarriers are frequency division multiplexed. In an eleventh aspect, alone or in combination with one or more of the first through tenth aspects, the one or more instructions, that cause the one or more processors to transmit the HARQ feedback for the one or more sidelink communications, cause the one or more processors to transmit one or more sequences that indicate the HARQ feedback for the one or more sidelink communications.

In a twelfth aspect, alone or in combination with one or more of the first through eleventh aspects, a length of the one or more sequences is based at least in part on at least one of a modulation order of one or more HARQ feedback communications for the HARQ feedback for the one or more sidelink communications, a bandwidth of the HARQ feedback occasion, a bandwidth of the one or more HARQ feedback communications, or a spacing between respective pluralities of subcarriers included in the one or more sets of subcarriers. In a thirteenth aspect, alone or in combination with one or more of the first through twelfth aspects, the one or more instructions, when executed by the one or more processors, further cause the one or more processors to generate a sequence of the one or more sequences based at least in part on at least one of a UE identifier associated with another UE, of the one or more other UEs, that transmitted a sidelink communication, of the one or more sidelink communications, associated with the sequence, a sidelink channel resource identifier associated with the sidelink communication, a frame identifier associated with the sidelink communication, a slot number associated with the sidelink communication, or a symbol number associated with the sidelink communication.

In a fourteenth aspect, alone or in combination with one or more of the first through thirteenth aspects, the one or more instructions, when executed by the one or more processors, further cause the one or more processors to modulate the one or more sequences based at least in part on a QAM modulation order. In a fifteenth aspect, alone or in combination with one or more of the first through fourteenth aspects, a time duration of the HARQ feedback occasion includes a plurality of symbols, and the one or more instructions, that cause the one or more processors to transmit the one or more sequences, cause the one or more processors to to transmit a sequence, of the one or more sequences, in each symbol of the plurality of symbols. In a sixteenth aspect, alone or in combination with one or more of the first through fifteenth aspects, the one or more instructions, that cause the one or more processors to transmit the HARQ feedback for the one or more sidelink communications, cause the one or more processors to transmit a plurality of sequences that indicate a HARQ feedback for a sidelink communication of the one or more sidelink communications, a time duration of the HARQ feedback occasion includes a plurality of symbols, and transmit the plurality of sequences that indicate the HARQ feedback for the sidelink communication comprises transmitting each sequence, of the plurality of sequences, in a respective symbol of the plurality of symbols, each sequence, of the plurality of sequences, being a different sequence of the plurality of sequences.

In a seventeenth aspect, alone or in combination with one or more of the first through sixteenth aspects, the one or more instructions, that cause the one or more processors to determine the HARQ feedback for the one or more sidelink communications, cause the one or more processors to determine, for a sidelink communication of the one or more sidelink communications, whether to transmit a NACK. In an eighteenth aspect, alone or in combination with one or more of the first through seventeenth aspects, the one or more instructions, that cause the one or more processors to transmit the one or more sequences that indicate the HARQ feedback for the one or more sidelink communications, cause the one or more processors to to transmit a PN sequence, of the one or more sequences, that indicates the NACK. In a nineteenth aspect, alone or in combination with one or more of the first through eighteenth aspects, the one or more instructions, when executed by the one or more processors, further cause the one or more processors to initialize a seed sequence based at least in part on determining to transmit the NACK and generating the PN sequence based at least in part on the seed sequence. In a twentieth aspect, alone or in combination with one or more of the first through nineteenth aspects, the one or more instructions, when executed by the one or more processors, further cause the one or more processors to generate the PN sequence; and apply an OCC or cyclic shift that is based at least in part on determining to transmit the NACK. In a twenty first aspect, alone or in combination with one or more of the first through twentieth aspects, the one or more instructions, that cause the one or more processors to determine the HARQ feedback for the one or more sidelink communications, cause the one or more processors to determine, for a sidelink communication of the one or more sidelink communications, whether to transmit a NACK or an ACK. In a twenty second aspect, alone or in combination with one or more of the first through twenty first aspects, the one or more instructions, that cause the one or more processors to transmit the one or more sequences that indicate the HARQ feedback for the one or more sidelink communications, cause the one or more processors to transmit a PN sequence, of the one or more sequences that indicates the NACK or the ACK.

In a twenty third aspect, alone or in combination with one or more of the first through twenty second aspects, the one or more instructions, when executed by the one or more processors, further cause the one or more processors to initialize a seed sequence based at least in part on determining whether to transmit the NACK or the ACK, and generate the PN sequence based at least in part on the seed sequence. In a twenty fourth aspect, alone or in combination with one or more of the first through twenty third aspects, the one or more instructions, when executed by the one or more processors, further cause the one or more processors to generate the PN sequence and applying an OCC or cyclic shift that is based at least in part on determining whether to transmit the NACK or the ACK.

In a twenty fifth aspect, alone or in combination with one or more of the first through twenty fourth aspects, the one or more instructions, when executed by the one or more processors, further cause the one or more processors to generate the PN sequence based at least in part on a UE identifier associated with another UE, of the one or more other UEs, that transmitted the sidelink communication. In a twenty sixth aspect, alone or in combination with one or more of the first through twenty fifth aspects, the one or more instructions, that cause the one or more processors to transmit the HARQ feedback for the one or more sidelink communications, cause the one or more processors to transmit the HARQ feedback for the one or more sidelink communications using a transmit power that is based at least in part on a number of HARQ feedback communications for the HARQ feedback for the one or more sidelink communications and a maximum number of HARQ feedback communications permitted to be transmitted in the HARQ feedback occasion.

In a twenty seventh aspect, alone or in combination with one or more of the first through twenty sixth aspects, the one or more instructions, when executed by the one or more processors, further cause the one or more processors to identify the HARQ feedback occasion from a plurality of periodic HARQ feedback occasions based at least in part on a time-domain resource location of the one or more sidelink communications, and a HARQ feedback delay parameter. In a twenty eighth aspect, alone or in combination with one or more of the first through twenty seventh aspects, the one or more instructions, that cause the one or more processors to identify the one or more sets of subcarriers, cause the one or more processors to identify a set of subcarriers of the one or more sets of subcarriers based at least in part on a subchannel, of the sidelink, in which a sidelink communication of the one or more sidelink communications was transmitted.

In a twenty ninth aspect, alone or in combination with one or more of the first through twenty eighth aspects, a sidelink communication, of the one or more sidelink communications, is transmitted across a plurality of slots, and the one or more instructions, when executed by the one or more processors, further cause the one or more processors to identify the HARQ feedback occasion based at least in part on an ending slot of the plurality of slots, and the one or more instructions, that cause the one or more processors to identify the one or more sets of subcarriers, cause the one or more processors to identify a set of subcarriers of the one or more sets of subcarriers based at least in part on a starting slot or an ending of the plurality of slots. In a thirtieth aspect, alone or in combination with one or more of the first through twenty ninth aspects, the one or more instructions, when executed by the one or more processors, further cause the one or more processors to receive the one or more sidelink communications using an unlicensed frequency spectrum, and wherein the one or more instructions, that cause the one or more processors to transmit the HARQ feedback, cause the one or more processors to transmit the HARQ feedback using the unlicensed frequency spectrum.

In some aspects, an apparatus for wireless communication may include means for determining HARQ feedback for one or more sidelink communications received from one or more other apparatuses; means for identifying one or more sets of subcarriers of a HARQ feedback occasion for the HARQ feedback for the one or more sidelink communications; and means for transmitting, to the one or more other apparatuses and on a sidelink, the HARQ feedback for the one or more sidelink communications using the one or more sets of subcarriers of the HARQ feedback occasion.

In a first aspect, each set of subcarriers, of the one or more sets of subcarriers, is associated with a respective HARQ feedback for a sidelink communication of the HARQ feedback for the one or more sidelink communications, and each set of subcarriers, of the one or more sets of subcarriers, includes a plurality of subcarriers. In a second aspect, alone or in combination with the first aspect, the plurality of subcarriers are non-contiguous and evenly spaced apart across a bandwidth for the HARQ feedback occasion. In a third aspect, alone or in combination with one or more of the first and second aspects, the plurality of subcarriers are non-contiguous and each spaced apart by a particular number of subcarriers.

In a fourth aspect, alone or in combination with one or more of the first through third aspects, the plurality of subcarriers are non-contiguous and each spaced apart by a number of subcarriers, and the number of subcarriers is based at least in part on at least one of a subcarrier spacing of the sidelink, a bandwidth of the sidelink, a number of subchannels included in the bandwidth of the sidelink, a number of resource blocks included in the bandwidth of the sidelink, or a periodicity of HARQ feedback occasions for the sidelink. In a fifth aspect, alone or in combination with one or more of the first through fourth aspects, the plurality of subcarriers are non-contiguous, and a number of the one or more sets of subcarriers is based at least in part on a spacing between the plurality of subcarriers.

In a sixth aspect, alone or in combination with one or more of the first through fifth aspects, the plurality of subcarriers includes a plurality of non-contiguous groups of contiguous subcarriers. In a seventh aspect, alone or in combination with one or more of the first through sixth aspects, the plurality of non-contiguous groups are each spaced apart by a particular number of subcarriers. In an eighth aspect, alone or in combination with one or more of the first through seventh aspects, the plurality of non-contiguous groups are each spaced apart by a number of subcarriers, and the number of subcarriers is based at least in part on at least one of a subcarrier spacing of the sidelink, a bandwidth of the sidelink, a number of subchannels included in the bandwidth of the sidelink, a number of resource blocks included in the bandwidth of the sidelink, or a periodicity of HARQ feedback occasions for the sidelink.

In a ninth aspect, alone or in combination with one or more of the first through eighth aspects, a number of the one or more sets of subcarriers is based at least in part on a spacing between the plurality of non-contiguous groups of contiguous subcarriers. In a tenth aspect, alone or in combination with one or more of the first through ninth aspects, each set of subcarriers, of the one or more sets of subcarriers, is associated with a respective HARQ feedback for a sidelink communication of the HARQ feedback for the one or more sidelink communications, each set of subcarriers, of the one or more sets of subcarriers, includes an exclusive plurality of subcarriers, and the one or more sets of subcarriers are frequency division multiplexed. In an eleventh aspect, alone or in combination with one or more of the first through tenth aspects, the means for transmitting the HARQ feedback for the one or more sidelink communications comprises means for transmitting one or more sequences that indicate the HARQ feedback for the one or more sidelink communications.

In a twelfth aspect, alone or in combination with one or more of the first through eleventh aspects, a length of the one or more sequences is based at least in part on at least one of a modulation order of one or more HARQ feedback communications for the HARQ feedback for the one or more sidelink communications, a bandwidth of the HARQ feedback occasion, a bandwidth of the one or more HARQ feedback communications, or a spacing between respective pluralities of subcarriers included in the one or more sets of subcarriers. In a thirteenth aspect, alone or in combination with one or more of the first through twelfth aspects, the apparatus further comprises means for generating a sequence of the one or more sequences based at least in part on at least one of a UE identifier associated with another apparatus, of the one or more other apparatus, that transmitted a sidelink communication, of the one or more sidelink communications, associated with the sequence, a sidelink channel resource identifier associated with the sidelink communication, a frame identifier associated with the sidelink communication, a slot number associated with the sidelink communication, or a symbol number associated with the sidelink communication.

In a fourteenth aspect, alone or in combination with one or more of the first through thirteenth aspects, the apparatus further comprises means for modulating the one or more sequences based at least in part on a QAM modulation order. In a fifteenth aspect, alone or in combination with one or more of the first through fourteenth aspects, a time duration of the HARQ feedback occasion includes a plurality of symbols, and the means for transmitting the one or more sequences comprises means for transmitting a sequence, of the one or more sequences, in each symbol of the plurality of symbols. In a sixteenth aspect, alone or in combination with one or more of the first through fifteenth aspects, the means for transmitting the HARQ feedback for the one or more sidelink communications comprises means for transmitting a plurality of sequences that indicate a HARQ feedback for a sidelink communication of the one or more sidelink communications, a time duration of the HARQ feedback occasion includes a plurality of symbols, and means for transmitting the plurality of sequences that indicate the HARQ feedback for the sidelink communication comprises transmitting each sequence, of the plurality of sequences, in a respective symbol of the plurality of symbols, each sequence, of the plurality of sequences, being a different sequence of the plurality of sequences.

In a seventeenth aspect, alone or in combination with one or more of the first through sixteenth aspects, the means for determining the HARQ feedback for the one or more sidelink communications comprises means for determining, for a sidelink communication of the one or more sidelink communications, whether to transmit a NACK. In an eighteenth aspect, alone or in combination with one or more of the first through seventeenth aspects, the means for transmitting the one or more sequences that indicate the HARQ feedback for the one or more sidelink communications comprises means for transmitting a PN sequence, of the one or more sequences, that indicates the NACK. In a nineteenth aspect, alone or in combination with one or more of the first through eighteenth aspects, the apparatus further comprises means for initializing a seed sequence based at least in part on determining to transmit the NACK and means for generating the PN sequence based at least in part on the seed sequence. In a twentieth aspect, alone or in combination with one or more of the first through nineteenth aspects, the apparatus further comprises means for generating the PN sequence; and means for applying an OCC or cyclic shift that is based at least in part on determining to transmit the NACK. In a twenty first aspect, alone or in combination with one or more of the first through twentieth aspects, the means for determining the HARQ feedback for the one or more sidelink communications comprises means for determining, for a sidelink communication of the one or more sidelink communications, whether to transmit a NACK or an ACK. In a twenty second aspect, alone or in combination with one or more of the first through twenty first aspects, the means for transmitting the one or more sequences that indicate the HARQ feedback for the one or more sidelink communications comprises means for transmitting a PN sequence, of the one or more sequences that indicates the NACK or the ACK.

In a twenty third aspect, alone or in combination with one or more of the first through twenty second aspects, the apparatus further comprises means for initializing a seed sequence based at least in part on determining whether to transmit the NACK or the ACK, and means for generating the PN sequence based at least in part on the seed sequence. In a twenty fourth aspect, alone or in combination with one or more of the first through twenty third aspects, the apparatus further comprises means for generating the PN sequence and applying an OCC or cyclic shift that is based at least in part on determining whether to transmit the NACK or the ACK.

In a twenty fifth aspect, alone or in combination with one or more of the first through twenty fourth aspects, the apparatus further comprises means for generating the PN sequence based at least in part on a UE identifier associated with another apparatus, of the one or more other apparatuses, that transmitted the sidelink communication. In a twenty sixth aspect, alone or in combination with one or more of the first through twenty fifth aspects, the means for transmitting the HARQ feedback for the one or more sidelink communications comprises means for transmitting the HARQ feedback for the one or more sidelink communications using a transmit power that is based at least in part on a number of HARQ feedback communications for the HARQ feedback for the one or more sidelink communications and a maximum number of HARQ feedback communications permitted to be transmitted in the HARQ feedback occasion.

In a twenty seventh aspect, alone or in combination with one or more of the first through twenty sixth aspects, the apparatus further comprises means for identifying the HARQ feedback occasion from a plurality of periodic HARQ feedback occasions based at least in part on a time-domain resource location of the one or more sidelink communications, and a HARQ feedback delay parameter. In a twenty eighth aspect, alone or in combination with one or more of the first through twenty seventh aspects, the means for identifying the one or more sets of subcarriers comprises means for identifying a set of subcarriers of the one or more sets of subcarriers based at least in part on a subchannel, of the sidelink, in which a sidelink communication of the one or more sidelink communications was transmitted.

In a twenty ninth aspect, alone or in combination with one or more of the first through twenty eighth aspects, a sidelink communication, of the one or more sidelink communications, is transmitted across a plurality of slots, and the apparatus further comprises means for identifying the HARQ feedback occasion based at least in part on an ending slot of the plurality of slots, and means for identifying the one or more sets of subcarriers comprises identifying a set of subcarriers of the one or more sets of subcarriers based at least in part on a starting slot or an ending of the plurality of slots. In a thirtieth aspect, alone or in combination with one or more of the first through twenty ninth aspects, the apparatus includes means for receiving the one or more sidelink communications using an unlicensed frequency spectrum, and wherein the means for transmitting the HARQ feedback comprises means for transmitting the HARQ feedback using the unlicensed frequency spectrum.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
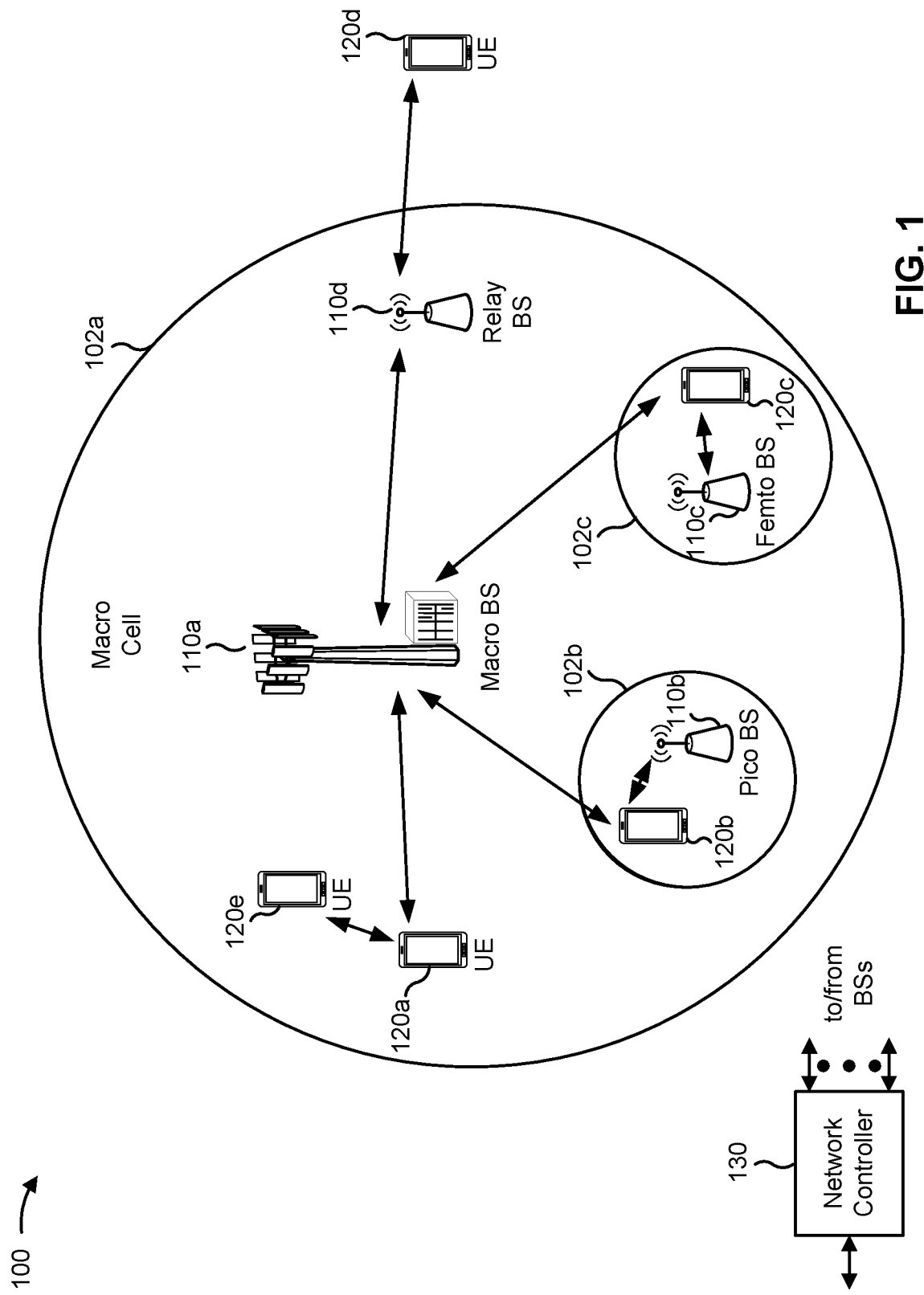
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. ABS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may communicate with one or more BSs in wireless network 100, may communicate directly with another UE (e.g., UE 120a and UE 120e, as illustrated in FIG. 1) via a sidelink, and/or the like. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
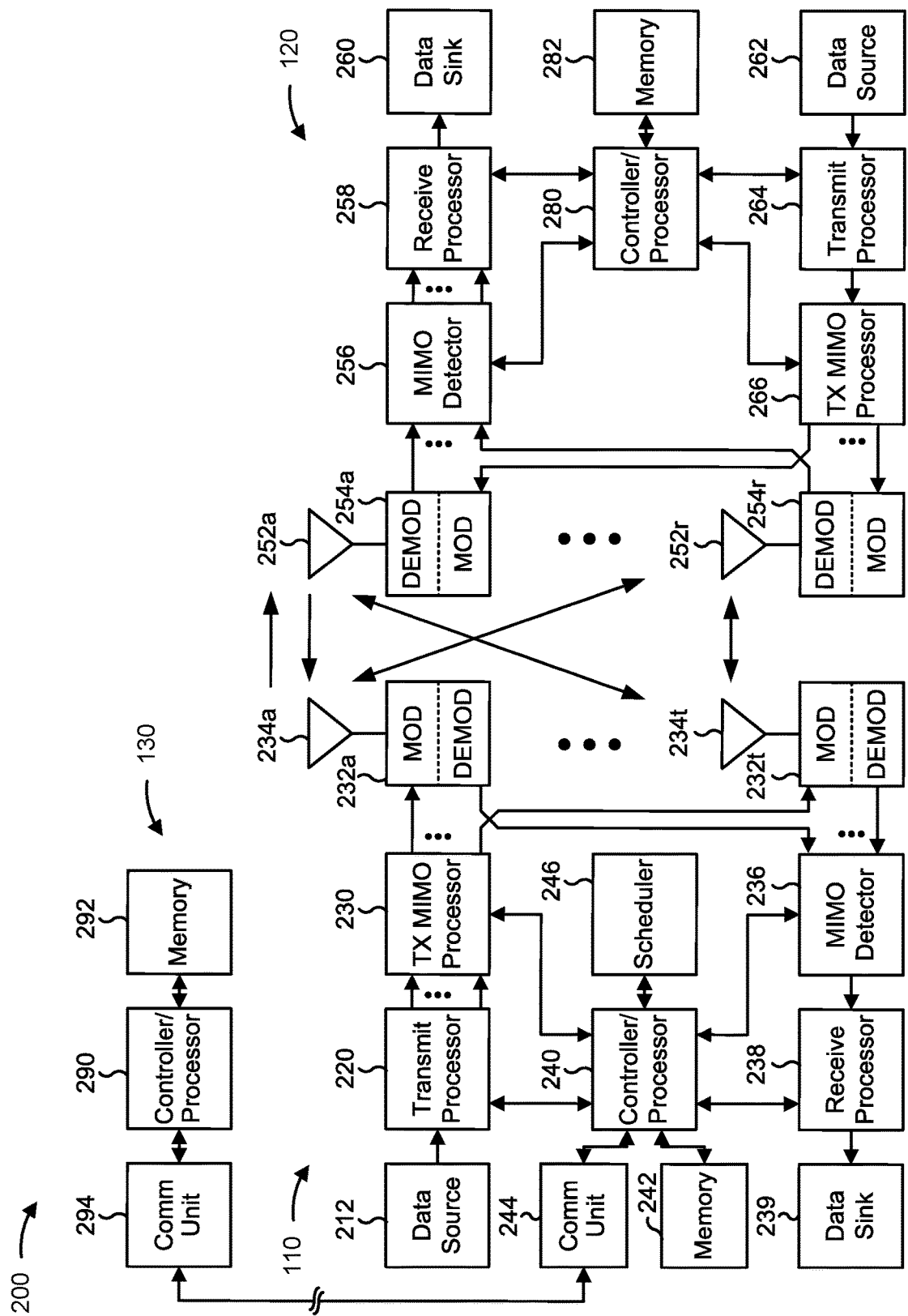
FIG. 2 is a block diagram conceptually illustrating an example of a base station in communication with a user equipment (UE) in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s)

selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with transmitting sidelink hybrid automatic repeat request (HARD) feedback, as described in more detail elsewhere herein. For example, controller/processor 240 of base station 110, controller/processor 280 of UE 120, and/or any other component(s) of FIG. 2 may perform or direct operations of, for example, process 500 of FIG. 5 and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direction operations of, for example, process 500 of FIG. 5 and/or other processes as described herein. A scheduler 246 may schedule UEs for data transmission on the downlink and/or uplink.

In some aspects, UE 120 may include means for determining HARQ feedback for one or more sidelink communications received from one or more other UEs, means for identifying one or more sets of subcarriers of a HARQ feedback occasion for the HARQ feedback for the one or more sidelink communications, means for transmitting, to the one or more other UEs and on a sidelink, the HARQ feedback for the one or more sidelink communications using the one or more sets of subcarriers of the HARQ feedback occasion, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

As indicated above, FIG. 2 is provided as an example. Other examples may differ from what is described with regard to FIG. 2.

Figure 3A:
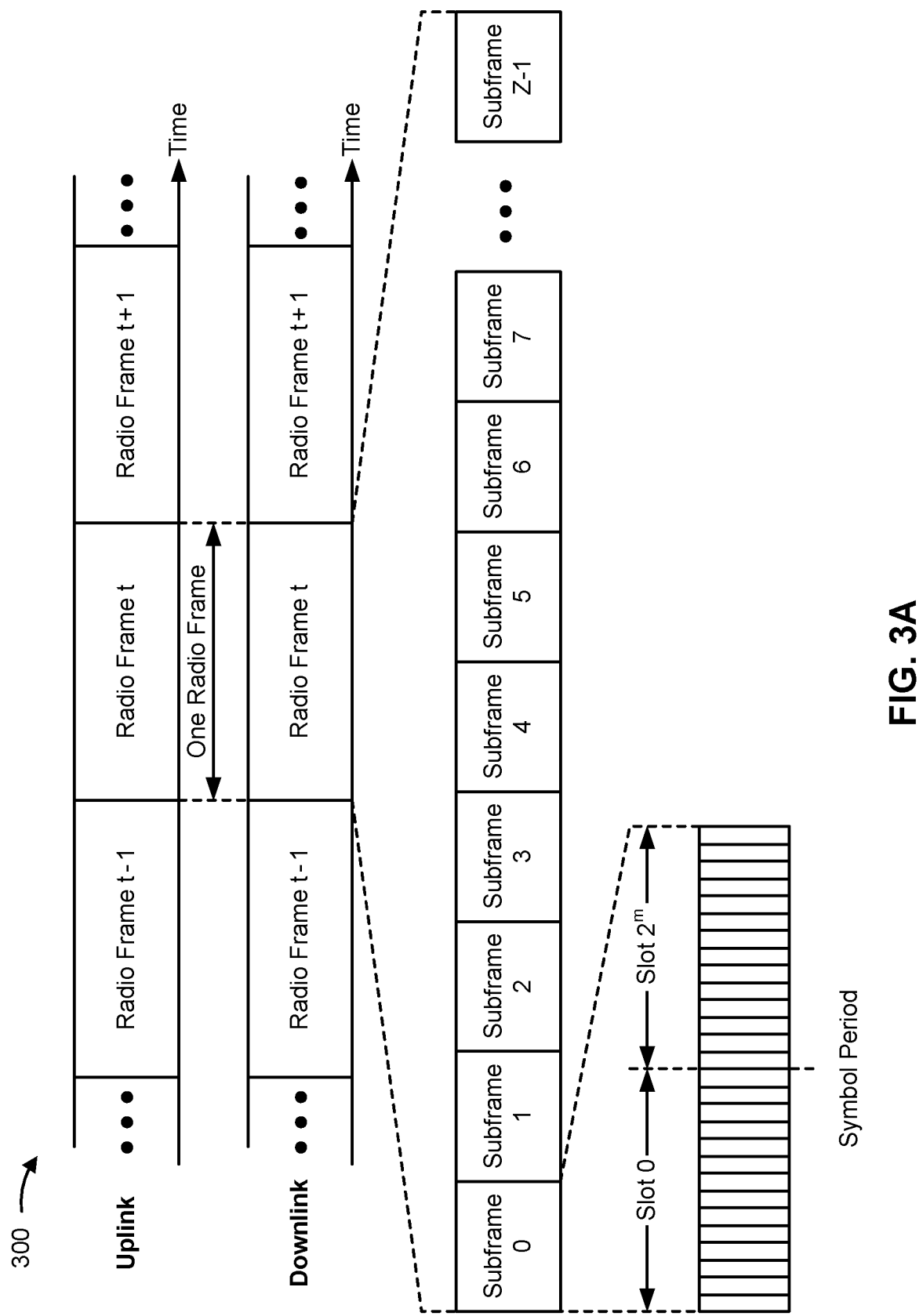
FIG. 3A is a block diagram conceptually illustrating an example of a frame structure in a wireless communication network, in accordance with various aspects of the present disclosure.

FIG. 3A shows an example frame structure 300 for frequency division duplexing (FDD) in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z−1). Each subframe may have a predetermined duration (e.g., 1 ms) and may include a set of slots (e.g., $2^m$ slots per subframe are shown in FIG. 3A, where m is a numerology used for a transmission, such as 0, 1, 2, 3, 4, and/or the like). Each slot may include a set of L symbol periods. For example, each slot may include fourteen symbol periods (e.g., as shown in FIG. 3A), seven symbol periods, or another number of symbol periods. In a case where the subframe includes two slots (e.g., when m=1), the subframe may include 2L symbol periods, where the 2L symbol periods in each subframe may be assigned indices of 0 through 2L−1. In some aspects, a scheduling unit for the FDD may be frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a periodic time-bounded communication unit defined by a wireless communication standard and/or protocol may be referred to as a wireless communication structure. Additionally, or alternatively, different configurations of wireless communication structures than those shown in FIG. 3A may be used.

In some aspects, a UE (e.g., UE 120a, UE 120e, and/or the like) may transmit, to another UE (e.g., UE 120a, UE 120e, and/or the like) and on a sidelink, one or more sidelink communications. The UE may transmit the one or more sidelink communications in one or more slots included in a frame structure 300, in one or more subcarriers or subchannels included in a frame structure 300, and/or the like. In some aspects, the other UE may receive the one or more sidelink communications, may generate HARQ feedback for the one or more sidelink communications, may incorporate the HARQ feedback into one or more HARQ feedback communications, and may transmit, to the UE and on the sidelink, the one or more HARQ feedback communications in a reporting period or HARQ occasion, in a frame structure 300, configured for the sidelink.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
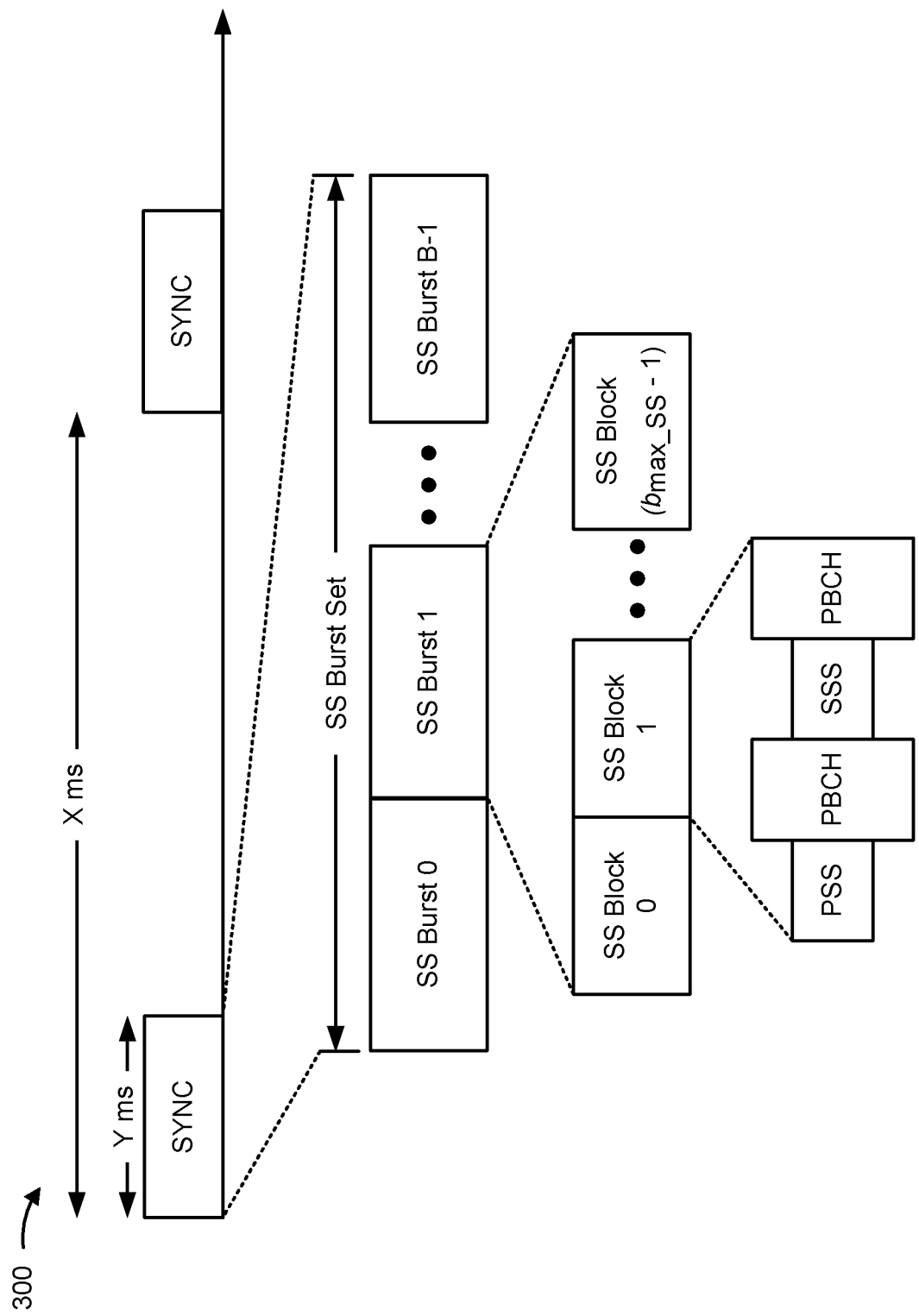
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B-1, where B is a maximum number of repetitions of the SS burst that may be transmitted by the base station). As further shown, each SS burst may include one or more SS blocks (identified as SS block 0 through SS block ($b_{max\_SS-1}$), where $b_{max\_SS-1}$ is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more slots. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain slots. The base station may transmit control information/data on a physical downlink control channel (PDCCH) in C symbol periods of a slot, where B may be configurable for each slot. The base station may transmit traffic data and/or other data on the PDSCH in the remaining symbol periods of each slot.

As indicated above, FIGS. 3A and 3B are provided as examples. Other examples may differ from what is described with regard to FIGS. 3A and 3B.

In some cases, two or more subordinate entities (e.g., UEs) may communicate with each other using sidelink signals. Real-world applications of such sidelink communications may include public safety, proximity services, UE-to-network relaying, V2X communications, Internet of Everything (IoE) communications, IoT communications, mission-critical mesh, and/or various other suitable applications. A communication that is transmitted from one subordinate entity (e.g., UE1) to another subordinate entity (e.g., UE2) without relaying that communication through a scheduling entity (e.g., UE or BS), may be referred to as a sidelink communication, even though the scheduling entity may be utilized for scheduling and/or control purposes. In some examples, a sidelink communication may be transmitted using a licensed frequency spectrum, an unlicensed frequency spectrum (e.g., an industrial, scientific and medical (ISM) radio band, such as 5 GHz, that is reserved and/or shared for purposes other than and/or in addition to cellular communication such as Wi-Fi, and/or the like).

In some cases, a UE may provide, to another UE, feedback associated with a sidelink communication that was received from the other UE on a sidelink between the UE and the other UE. The feedback may include, for example, HARQ feedback (e.g., NACK or ACK for the sidelink communication). The UE may transmit the HARQ feedback in one or more HARQ feedback communications on the sidelink. In some cases, a frame structure for the sidelink may include a HARQ feedback occasion that may be used for transmitting the one or more HARQ feedback communications. Unlike a cellular communication link with a BS, where the UE may provide HARQ feedback to a single BS, the UE may be permitted to provide HARQ feedback to a plurality of UEs on a sidelink in a HARQ feedback occasion.

Some aspects described herein provide techniques and apparatuses for transmitting sidelink HARQ feedback. In some aspects, a UE may receive one or more sidelink communications on a sidelink and from one or more other UEs. The UE may transmit, to the one or more other UEs and on a sidelink, HARQ feedback for the one or more sidelink communications in a HARQ feedback occasion. Since the UE may be permitted to provide HARQ feedback to a plurality of other UEs in the HARQ feedback occasion, the frequency bandwidth of the HARQ feedback occasion may be partitioned into sets of subcarriers. In some aspects, the UE may use each set of subcarriers to transmit HARQ feedback for a respective sidelink communication. The UE may use the techniques described herein to identify one or more sets of subcarriers of the HARQ feedback occasion for the HARQ feedback for the one or more sidelink communications. In this way, the UE is capable of multiplexing HARQ feedback in the HARQ feedback occasion for the one or more sidelink communications.

FIGS. 4A-4E are diagrams illustrating one or more examples 400 of transmitting sidelink HARQ feedback, in accordance with various aspects of the present disclosure. As shown in FIGS. 4A-4E, examples 400 may include a plurality of UEs (e.g., UE 120), such as UE1, UE2. However, in some aspects, a greater number of UEs may be included in examples 400. UE1 and UE2 may be included in a wireless network (e.g., wireless network 100) and may communicate via a sidelink. In some aspects, the sidelink may be configured with a frame structure, such as a frame structure 300 of FIG. 3A and/or another sidelink frame structure.

Figure 4A:
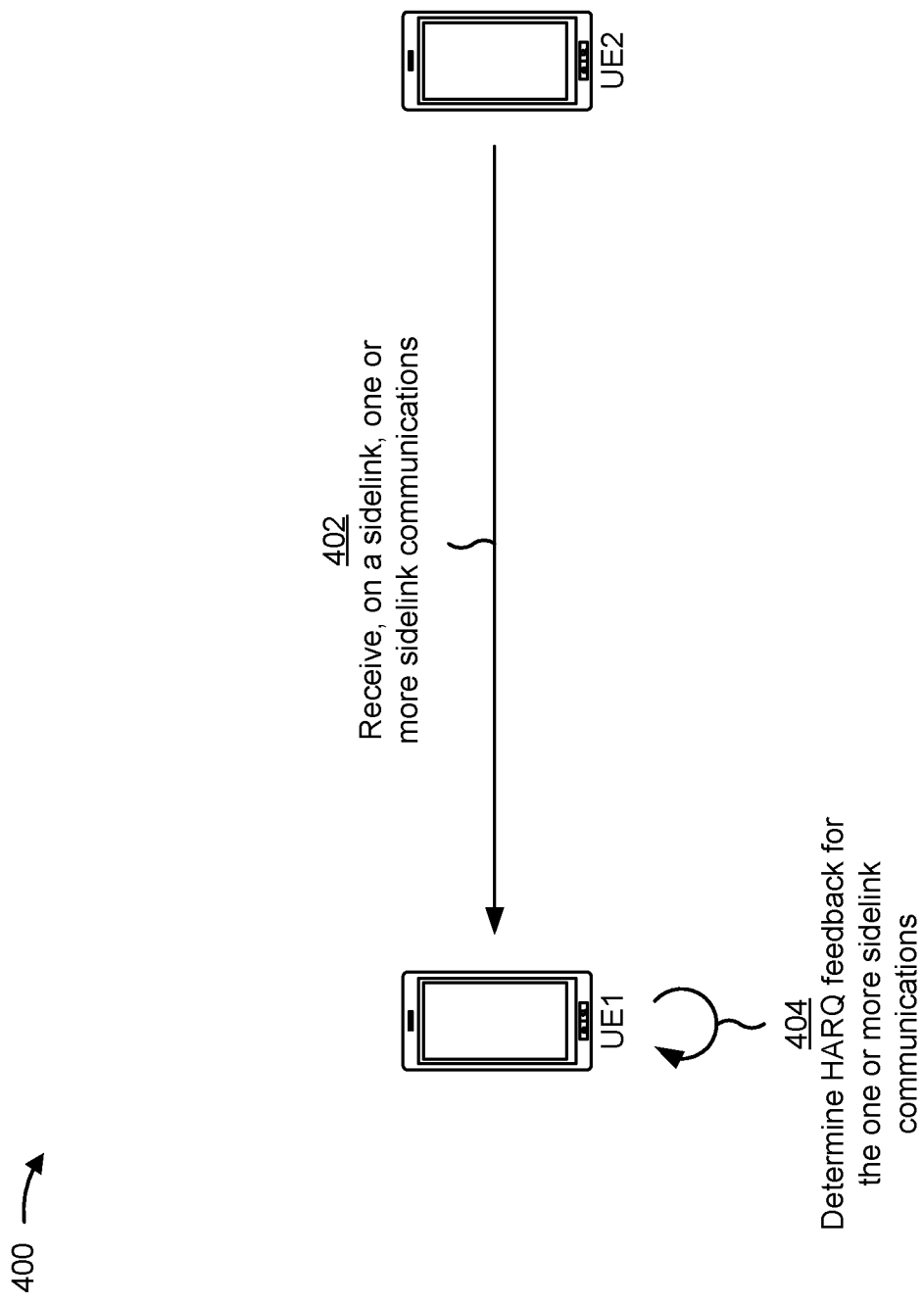
FIGS. 4A-4E are diagrams illustrating one or more examples of transmitting sidelink hybrid automatic repeat request (HARQ) feedback, in accordance with various aspects of the present disclosure.

As shown in FIG. 4A, and by reference number 402, UE1 and UE2 may communicate via the sidelink by transmitting and/or receiving sidelink communications via the sidelink. For example, UE2 may transmit one or more sidelink communications to UE1 via the sidelink, and UE1 may receive the one or more sidelink communications on the sidelink. In some aspects, UE1 may receive the one or more sidelink communications on the sidelink from a plurality of UEs that includes UE2.

In some aspects, the one or more sidelink communications may be transmitted on one or more channels or subchannels of the sidelink. In this case, each sidelink communication may be transmitted in one or more time-domain resources (e.g., across one or more slots, across one or more symbols, and/or the like) and/or in one or more frequency-domain resources (e.g., in a subchannel of the frequency bandwidth of the sidelink). In some aspects, a subchannel may include a plurality of subcarriers of the frequency bandwidth sidelink, one or more resource blocks of the frequency bandwidth of the sidelink, and/or the like. As indicated above, sidelink communications may be transmitted using a licensed frequency spectrum and/or an unlicensed frequency spectrum. Accordingly, UE2 may transmit one or more sidelink communications to UE1 using a licensed frequency spectrum and/or an unlicensed frequency spectrum.

As further shown in FIG. 4A, and by reference number 404, UE1 may determine HARQ feedback for the one or more sidelink communications. The HARQ feedback, for a sidelink communication, may include an acknowledgment (ACK) or a negative acknowledgement (NACK). An ACK may indicate, to the transmitter of the sidelink communication (e.g., UE2 or another UE), that the sidelink communi- cation was successfully received and decoded. A NACK may indicate, to the transmitter of the sidelink communication (e.g., UE2 or another UE), that the sidelink communication was not successfully received or decoded. In some aspects, UE1 may determine the HARQ feedback to be an ACK if UE1 is capable of decoding both the control information (e.g., sidelink control information (SCI)) of the sidelink communication and the corresponding data of the sidelink communication. In some aspects, UE1 may determine the HARQ feedback to be a NACK if UE1 is not capable of decoding the control information (e.g., sidelink control information (SCI)) of the sidelink communication, the corresponding data of the sidelink communication, or both the control information and the corresponding data.

In some aspects, UE1 and UE2 may communicate using an ACK/NACK HARQ feedback configuration, in which UE1 and UE2 are to transmit an ACK based at least in part on successfully receiving and decoding a sidelink communication, and are to transmit a NACK for a sidelink communication that is unable to decoded. In some aspects, UE1 and UE2 may communicate using a NACK-only HARQ feedback configuration, in which UE1 and UE2 do not transmit HARQ feedback for sidelink communications that are successfully received and decoded, and only transmit a NACK for sidelink communications that are unable to decoded.

Figure 4B:
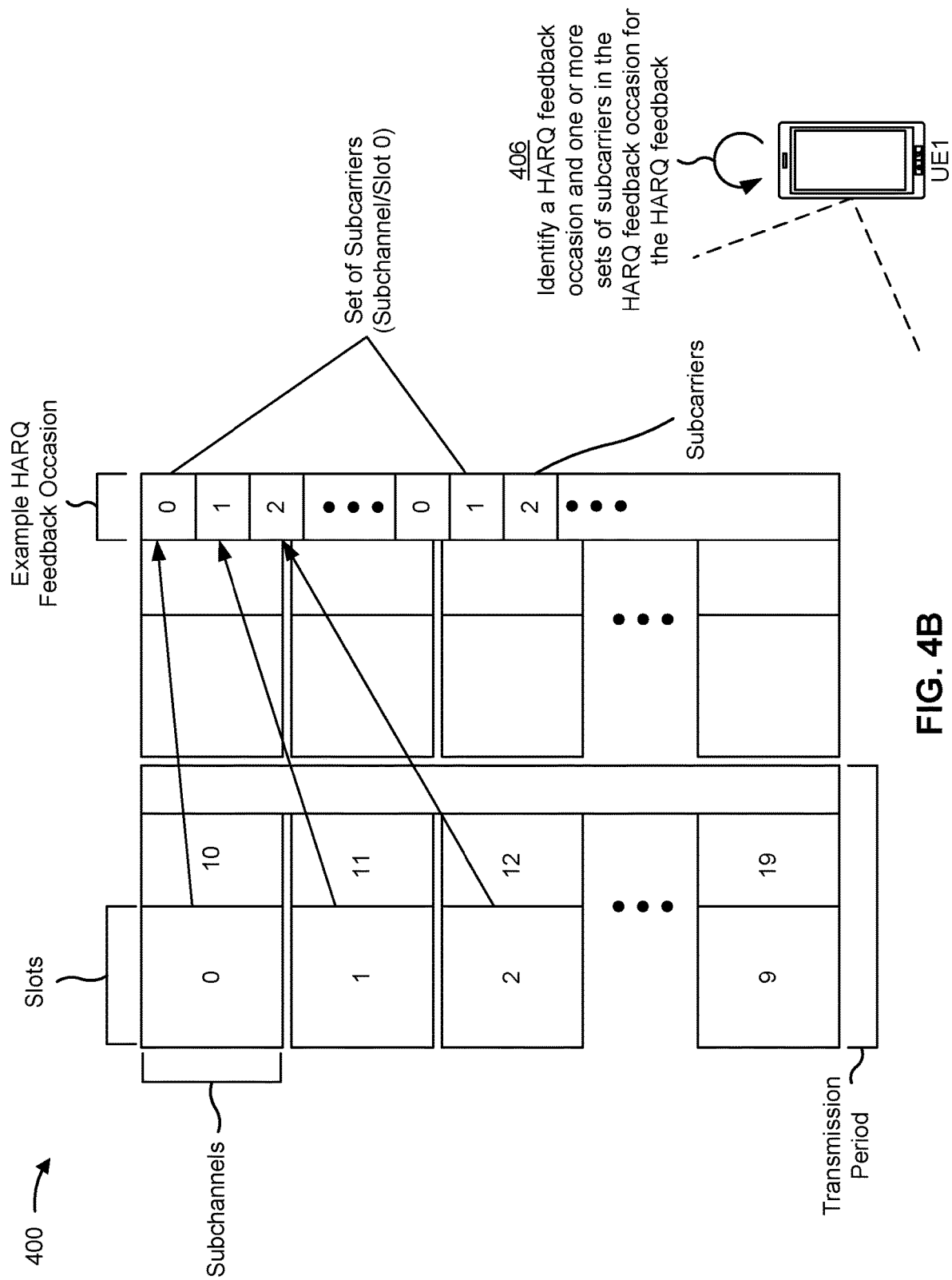

As shown in FIG. 4B, and by reference number 406, UE1 may identify a HARQ feedback occasion and one or more sets of subcarriers in the HARQ feedback occasion for the HARQ feedback associated with the one or more sidelink communications. FIG. 4B illustrates an example HARQ feedback occasion in which HARQ feedback for one or more sidelink communications may be transmitted. As shown in FIG. 4B, a HARQ feedback occasion may include a time-domain duration (e.g., one or more symbols) and a plurality of frequency-domain resources (e.g., a plurality of subcarriers) that are reserved for HARQ feedback on the sidelink. In some aspects, the frame structure of the sidelink may include a plurality of HARQ feedback occasions. The plurality of HARQ feedback occasions may be periodic (e.g., may occur at a particular time interval), may be configured at particular time-domain locations, and/or the like. In some aspects, a HARQ feedback occasion may be a multi-slot HARQ feedback occasion in that the HARQ feedback occasion may be used to aggregate HARQ feedback for sidelink communications that were transmitted in a plurality of subchannels and a plurality of slots that occurred prior to the HARQ feedback occasion. In this way, UE1 may use a HARQ feedback occasion to FDM and transmit HARQ feedback for a plurality of slots and a plurality of subchannels.

The plurality of slots corresponding to a HARQ feedback occasion may be referred to as a transmission period for the HARQ feedback occasion. HARQ feedback for sidelink communications that were transmitted during the transmission period may be transmitted in the HARQ feedback occasion associated with the transmission period. In the example illustrated in FIG. 4B, the transmission period for the example HARQ feedback occasion may span 2 slots and 10 subchannels. In this example, the transmission period for the example HARQ feedback occasion may include 20 time-frequency resources (e.g., subchannel/slot 0 through subchannel/slot 19) in which sidelink communications may be transmitted.

In some aspects, UE1 may identify the HARQ feedback occasion in which to transmit HARQ feedback for a sidelink communication based at least in part a time-domain resource location of the sidelink communication (e.g., a slot in which the sidelink communication was received, the last or ending slot of a multi-slot sidelink communication, and/or the like). For example, UE1 may determine that the time-domain resource location of the sidelink communication (e.g., the slot in which the sidelink communication was received, a first or starting slot of a multi-slot sidelink communication, a last or ending slot of a multi-slot sidelink communication, and/or the like) is mapped to a particular HARQ feedback occasion (e.g., is included in a transmission period associated with the HARQ feedback occasion). As another example, UE1 may determine the HARQ feedback occasion based at least in part on a HARQ feedback processing capability of the UE (e.g., an amount of time that UE1 takes to determine and transmit HARQ feedback for a sidelink communication). As a further example, UE1 may determine the HARQ feedback occasion based at least in part on a HARQ feedback delay parameter configured for the wireless network (e.g., a system-wide delay between receiving a sidelink communication and transmitting HARQ feedback for the sidelink communication). Accordingly, UE1 may determine the HARQ feedback occasion to be the next HARQ feedback occasion that occurs in the time-domain relative to when the sidelink communication was received or may determine the HARQ feedback occasion as a HARQ feedback occasion that occurs m slots after the slot in which the sidelink communication was received.

As further shown in FIG. 4B, the plurality of frequency-domain resources in the HARQ feedback occasion may be partitioned into a plurality of sets of subcarriers. As an example, the HARQ feedback occasion may include a first set of subcarriers 0, a second set of subcarriers 1, and so on. The plurality of sets of subcarriers may be frequency division multiplexed in the HARQ feedback occasion. Each set of subcarriers may include a plurality of subcarriers. In some aspects, a plurality of subcarriers, included in a set of subcarriers in the HARQ feedback occasion, may be exclusive to the set of subcarriers. In this case, no subcarrier, included in the plurality of subcarriers, is included in another set of subcarriers in the HARQ feedback occasion.

In some aspects, each set of subcarriers in the HARQ feedback occasion may be associated with a time-frequency resource in the transmission period associated with the HARQ feedback occasion. UE1 may receive a HARQ configuration (e.g., from UE2, from another UE, from a BS in the wireless network, and/or the like) that identifies the mapping between sets of subcarriers and time-frequency resources, may be hard coded with the HARQ configuration (e.g., the HARQ configuration may be stored on UE1 prior to UE1 being deployed in the wireless network), and/or the like. Accordingly, UE1 may identify a set of subcarriers, in the HARQ feedback occasion, for transmitting HARQ feedback for a sidelink communication based at least in part on the time-domain resource (e.g., slot) and the frequency-domain resource (e.g., subchannel) in which the sidelink communication was received.

As an example of the above, subchannel/slot 0 may be associated with set of subcarriers 0, subchannel/slot 1 may be associated with set of subcarriers 1, subchannel/slot 2 may be associated with set of subcarriers 2, subchannel/slot 3 may be associated with set of subcarriers 3, and so on. In some aspects, time-frequency resources in a transmission period may be assigned sets of subcarriers in a column-major (e.g., as illustrated in FIG. 4B), in which all of the time-frequency resources in a slot are mapped to sets of subcarriers before proceeding to the next slot to map time-frequency resources to sets of subcarriers. In some aspects, time-frequency resources in a transmission period may be assigned sets of subcarriers in a row-major in which all of the time-frequency resources in a subchannel in transmission period are mapped to sets of subcarriers before proceeding to the next subchannel to map time-frequency resources to sets of subcarriers.

In some aspects, UE1 may identify the set of subcarriers in which to transmit HARQ feedback for a sidelink communication based at least in part on the time-frequency resource in which the sidelink communication was received. In this case, HARQ feedback for each sidelink communication may be associated with a respective set of subcarriers. For example, UE1 may identify set of subcarriers 0 for HARQ feedback for a sidelink communication that was received in subchannel/slot 0, may identify set of subcarriers 1 for HARQ feedback for a sidelink communication that was received in subchannel/slot 1, may identify set of subcarriers 2 for HARQ feedback for a sidelink communication that was received in subchannel/slot 2, and so on. Accordingly, UE1 may identify respective sets of subcarriers, in the HARQ feedback occasion, in which to transmit HARQ feedback for one or more sidelink communications based at least in part on the time-frequency resources in which the one or more sidelink communications were received.

In some aspects, the transmission of a sidelink communication may span a plurality of slots. In this case, the sidelink communication may be referred to as a multi-slot sidelink communication. UE1 may determine the set of subcarriers for the HARQ feedback for a multi-slot sidelink communication may be determined based at least in part on the first or starting slot for the multi-slot sidelink communication or may be determined based at least in part on a last or ending slot for the multi-slot sidelink communication.

Figure 4C:
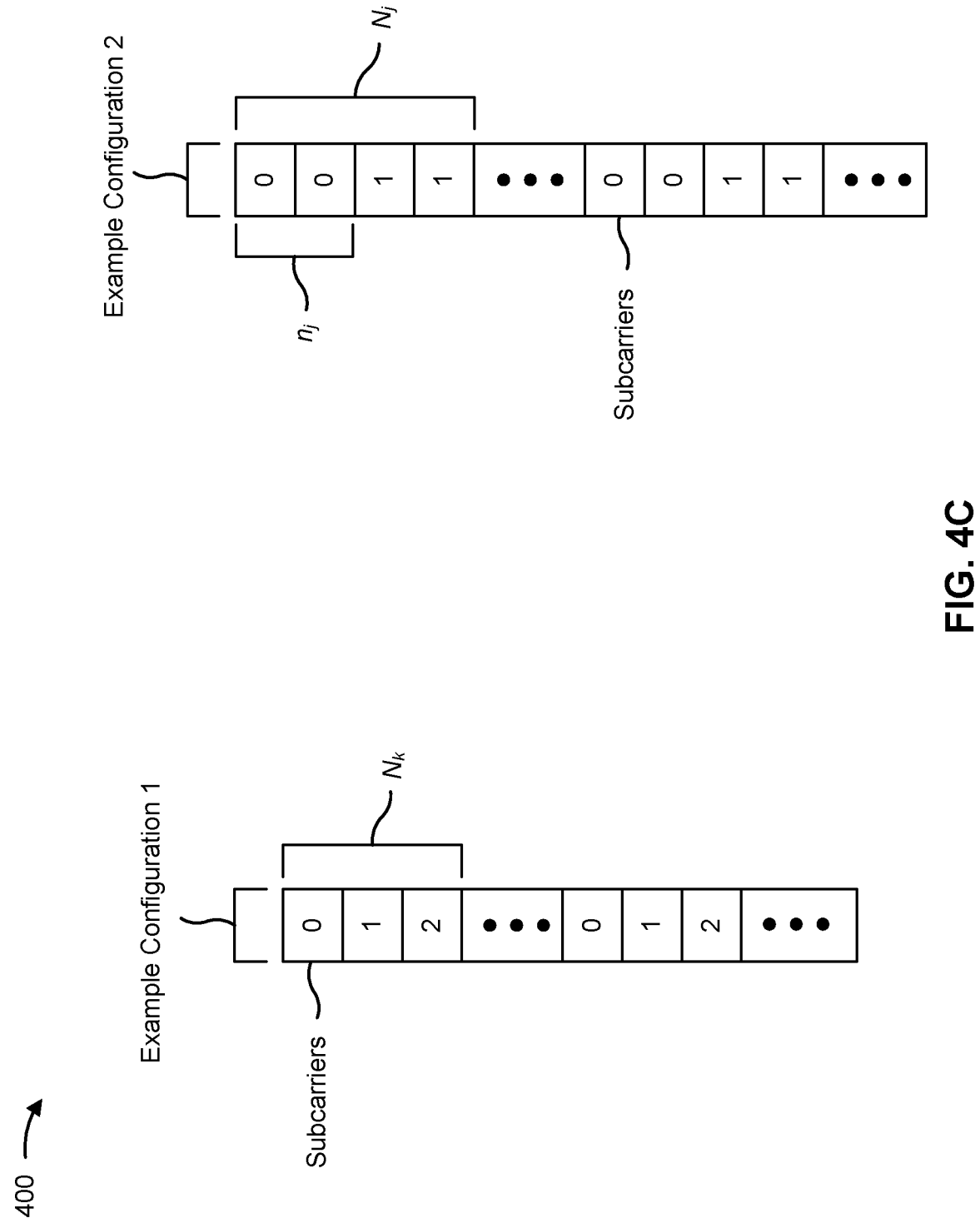

FIG. 4C illustrates various example configurations for the sets of subcarriers included in a HARQ feedback occasion. Other configurations for sets of subcarriers may be used for HARQ feedback occasions. In some aspects, the configuration for the sets of subcarriers included in a HARQ feedback occasion may be indicated in the HARQ configuration described above.

As shown in example configuration 1 in FIG. 4C, each set of subcarriers (e.g., set of subcarriers 0, set of subcarriers 1, and so on) in a HARQ feedback occasion may include a respective plurality of subcarriers. The plurality of subcarriers in a set of subcarriers may be non-contiguous subcarriers that are spaced apart to form a frequency comb in the HARQ feedback occasion. In some aspects, the plurality of subcarriers in a set of subcarriers may be unevenly spaced apart (e.g., some subcarriers in the set of subcarriers may be spaced apart by a different number of subcarriers relative to other subcarriers in the set of subcarriers) across the frequency bandwidth for the HARQ feedback occasion.

In some aspects, and as illustrated in example configuration 1 in FIG. 4C, the plurality of subcarriers in a set of subcarriers may be evenly spaced apart across the frequency bandwidth for the HARQ feedback occasion. In this case, each subcarrier in a set of subcarriers may be spaced apart by the same number of subcarriers, which may be indicated as $N_k$ in FIG. 4C. Accordingly, the value of $N_k$ (e.g., the spacing between subcarriers within a set of subcarriers) may correspond to the number of sets of subcarriers (and thus, the number of sidelink communications for which HARQ feedback may be transmitted) in the HARQ feedback occasion. In some aspects, the value of $N_k$ may be based at least in part on various factors, such as a subcarrier spacing of the sidelink, a bandwidth of the sidelink, a number of subchannels included in the bandwidth of the sidelink, a number of resource blocks included in the bandwidth of the sidelink, a periodicity of HARQ feedback occasions for the sidelink, and/or the like.

As an example, the value of $N_k$ may be determined by number of subchannels and periodicity of HARQ feedback occasions. For m1 subchannels, the period of HARQ occasions may be m2 (e.g., a HARQ occasion occurs every m2-th slot), then the value $N_k$ may be determined to be m1*m2, such that m1*m2 number of HARQ feedback can be accommodated in a HARQ feedback occasion. As another example, the value of $N_k$ may be determined to be equal to or larger than m1*m2, such that $N_k$ can be divided by number of subcarriers in a resource block (e.g., which may include 12 in LTE or NR and/or another number of subcarriers). For example, if m1 is 10 and m2 is 2, $N_k$ may be determined to be 24.

As shown in example configuration 2 in FIG. 4C, each set of subcarriers (e.g., set of subcarriers 0, set of subcarriers 1, and so on) in a HARQ feedback occasion may include a respective plurality of subcarriers. The plurality of subcarriers in a set of subcarriers may be configured in a plurality of non-contiguous groups of contiguous subcarriers, where each group is spaced apart to form a frequency comb in the HARQ feedback occasion. In some aspects, the plurality of groups of subcarriers in a set of subcarriers may be unevenly spaced apart (e.g., some groups of subcarriers in the set of subcarriers may be spaced apart by a different number of subcarriers relative to other groups of subcarriers in the set of subcarriers) across the frequency bandwidth for the HARQ feedback occasion.

In some aspects, and as illustrated in example configuration 2 in FIG. 4C, the plurality of groups of subcarriers in a set of subcarriers may be evenly spaced apart across the frequency bandwidth for the HARQ feedback occasion. In this case, each group of subcarrier in a set of subcarriers may be spaced apart by the same number of subcarriers, which may be indicated as $N_j$ in FIG. 4C. Moreover, the number of subcarriers included in each group may be indicated as $n_j$ in FIG. 4C. Accordingly, the value of $N_j/n_j$ (e.g., the spacing between groups subcarriers within a set of subcarriers relative to the number of subcarriers in each group) may correspond to the number of sets of subcarriers (and thus, the number of sidelink communications for which HARQ feedback may be transmitted) in the HARQ feedback occasion. In some aspects, the value of $N_j$ and $n_j$ may be based at least in part on various factors, such as a subcarrier spacing of the sidelink, a bandwidth of the sidelink, a number of subchannels included in the bandwidth of the sidelink, a number of resource blocks included in the bandwidth of the sidelink, a periodicity of HARQ feedback occasions for the sidelink, and/or the like.

Figure 4D:
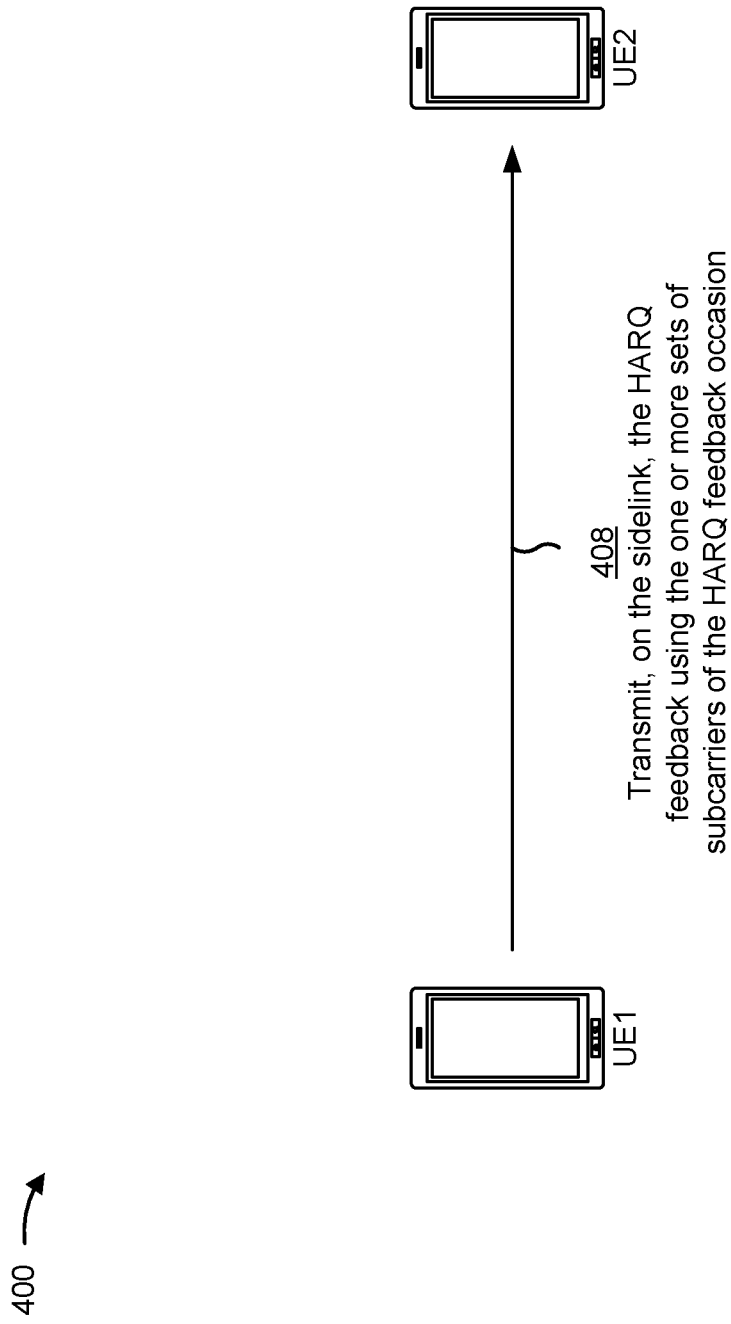

As shown in FIG. 4D, and by reference number 408, UE1 may transmit, on the sidelink, the HARQ feedback for the one or more sidelink communications using the one or more sets of subcarriers of the HARQ feedback occasion. For example, UE1 may transmit HARQ feedback for a first sidelink communication in a first set of subcarriers identified for the first sidelink communication, may transmit HARQ feedback for a second sidelink communication in a second set of subcarriers identified for the first sidelink communication, and so on. The UE may transmit the HARQ feedback for the one or more sidelink communications in one or more HARQ feedback communications to UE2 and/or other UEs that transmitted the one or more sidelink communications.

In some aspects, UE1 may transmit the HARQ feedback communications on a feedback channel, such as a physical sidelink feedback channel (PSFCH) and/or another type of channel. As indicated above, sidelink communications may be transmitted using a licensed frequency spectrum and/or an unlicensed frequency spectrum. Accordingly, UE1 may transmit the HARQ feedback communications on the sidelink to UE2 using a licensed frequency spectrum and/or an unlicensed frequency spectrum.

In some aspects, UE1 may determine a transmit power for transmitting the one or more HARQ feedback communications in the HARQ feedback occasion. In some aspects, UE1 may determine the transmit power based at least in part on a number of HARQ feedback communications that are to be transmitted in the HARQ feedback occasion (e.g., which may be denoted by $n_{feedback}$), based at least in part on a maximum number of HARQ feedback communications permitted to be transmitted in the HARQ feedback occasion, and/or the like. For example, UE1 may determine the transmit power based at least in part on a power scaling factor, which may be determined according to $$\sqrt{\frac{N_k}{n_{feedback}}},$$

where the plurality of sets of subcarriers in the HARQ feedback occasion each includes respective pluralities of non-contiguous subcarriers that are evenly spaced apart. As another example, UE1 may determine the transmit power based at least in part on a power scaling factor, which may be determined according to $$\sqrt{\frac{N_j/n_j}{n_{feedback}}},$$

where the plurality of sets of subcarriers in the HARQ feedback occasion each includes respective pluralities of subcarriers that are configured in a plurality of spaced apart non-contiguous groups of contiguous sub carriers.

In some aspects, to transmit the HARQ feedback for the one or more sidelink communications, UE1 may generate a sequence for each sidelink communication. The sequence for a sidelink communication may indicate the HARQ feedback (e.g., a NACK or an ACK) for the sidelink communication. The sequence for a sidelink communication may include a pseudorandom noise (PN) sequence, such as a Gold sequence, a maximum length sequence (m-sequence), and/or another type of PN sequence.

In some aspects, UE1 may generate a sequence for a sidelink communication based at least in part on various parameters, such as a UE identifier associated with the UE that transmitted the sidelink communication, a sidelink channel resource identifier associated with the sidelink communication (e.g., an identifier that identifies the sidelink channel on which the sidelink communication was received), a frame identifier associated with a radio frame in which the sidelink communication was received, a slot number associated with a slot in which the sidelink communication was received, a symbol number associated with a symbol in which the sidelink communication was received, and/or the like.

In some aspects, the length of a sequence for a sidelink communication may be based at least in part on various parameters, such as a modulation order of one or more HARQ feedback communications carrying the sequence, a bandwidth of the HARQ feedback occasion, a bandwidth of the one or more HARQ feedback communications carrying the sequence, a spacing between the plurality of subcarriers included in the set of subcarriers associated with the sidelink communication, and/or the like. In some aspects, UE1 may modulate the sequence after generating the sequence. In some aspects, UE1 may modulate a sequence based at least in part on a quadrature amplitude modulation (QAM) order, which may include, for example, 4-QAM, quadrature phase-shift keying (QPSK), offset QPSK (OQPSK), pi/4-QPSK, and/or the like.

In some aspects, such as when UE1 and UE2 communicate using an ACK/NACK HARQ feedback configuration, UE1 may generate a sequence for a sidelink communication such that the sequence is initialized based at least in part on whether the HARQ feedback for the sidelink communication is an ACK or a NACK. In this case, UE1 may initialize a seed sequence based at least in part on determining whether to transmit an ACK or a NACK, and may generate the sequence from the seed sequence. For example, the ACK or the NACK may be represented by one or more bits, and UE1 may use the values of the one or more bits to set the initial state of the seed sequence. Thus, UE1 may generate a base sequence that indicates whether the HARQ feedback for the sidelink communication is an ACK or a NACK.

In some aspects, such as when UE1 and UE2 communicate using an ACK/NACK HARQ feedback configuration, UE1 may generate a sequence for a sidelink communication such that UE1 generates the sequence from a seed sequence, and then applies an orthogonal cover code (OCC) and/or a cyclic shift to the base sequence after modulating the sequence. The OCC and/or cyclic shift may be based at least in part on whether the HARQ feedback for the sidelink communication is an ACK or a NACK. In this case, the cyclic shift or OCC, applied to the sequence, may indicated whether the HARQ feedback for the sidelink communication is an ACK or a NACK.

For example, UE1 may apply a first OCC to indicate an ACK and may apply a second (different) OCC to indicate a NACK. In aspects where HARQ feedback includes more than one bit (e.g., a sidelink communication has multiple transport blocks (TBs)) then multiple bits may be used for the HARQ feedback (because each bit corresponds to HARQ feedback for one TB). In this case, the OCC that is used to indicate ACK/NACK, may each indicate a combination of bits for multiple bits HARQ feedback (e.g., 2 bits, 4 bits, and/or the like). As an example, in aspects in which the number of bits of a HARQ feedback includes 2 bits, the OCC used to indicate a HARQ feedback may include a combination of two bits identified from 00, 01, 10, or 11, and, at least 4 different OCCs are may be used for this 2-bit HARQ feedback. For example, OCCs [+1, +1, +1, +1], [+1, −1, +1, −1], [+1, +1, −1, −1], and [+1, −1, −1, +1] may be used to indicate HARQ feedback 00, 01, 10, and 11, respectively.

In some aspects, such as when UE1 and UE2 communicate using a NACK-only HARQ feedback configuration, the presence of a sequence in the HARQ feedback occasion for a sidelink communication may indicate the NACK. In other words, since UE1 does not transmit ACK HARQ feedback for sidelink communications when using a NACK-only HARQ feedback configuration, UE1 does not need to distinguish the sequence for a NACK from a sequence for an ACK, and thus does not need to apply an OCC or cyclic shift to indicate the NACK. However, in some aspects, UE1 may generate the sequence and/or apply an OCC or cyclic shift based at least in part on determining to transmit a NACK.

Figure 4E:
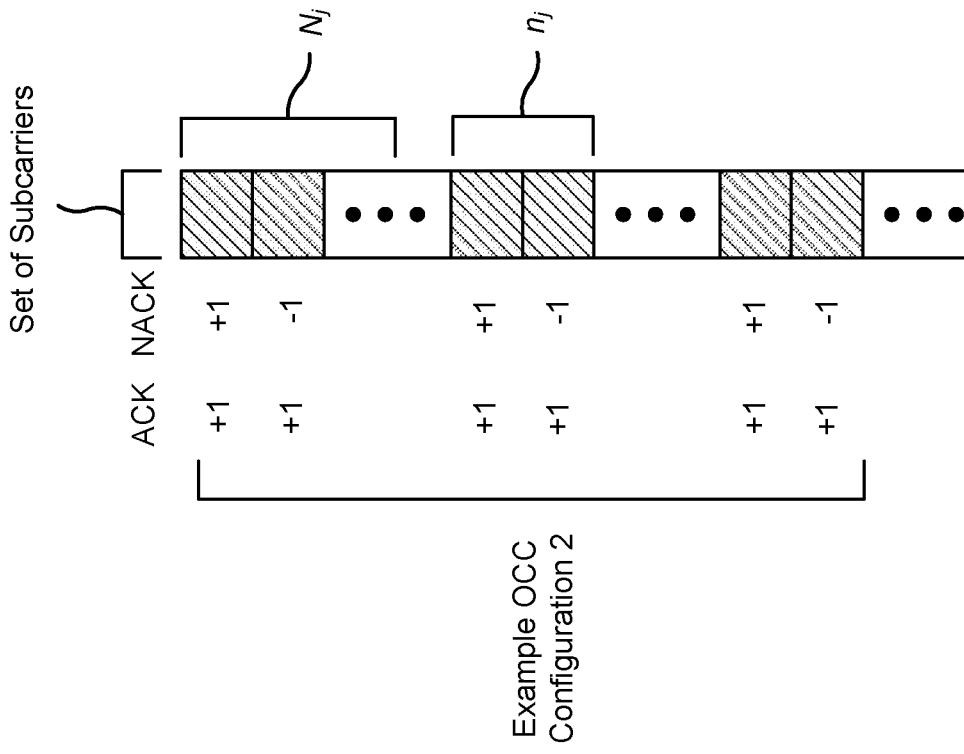
Figure 4E:
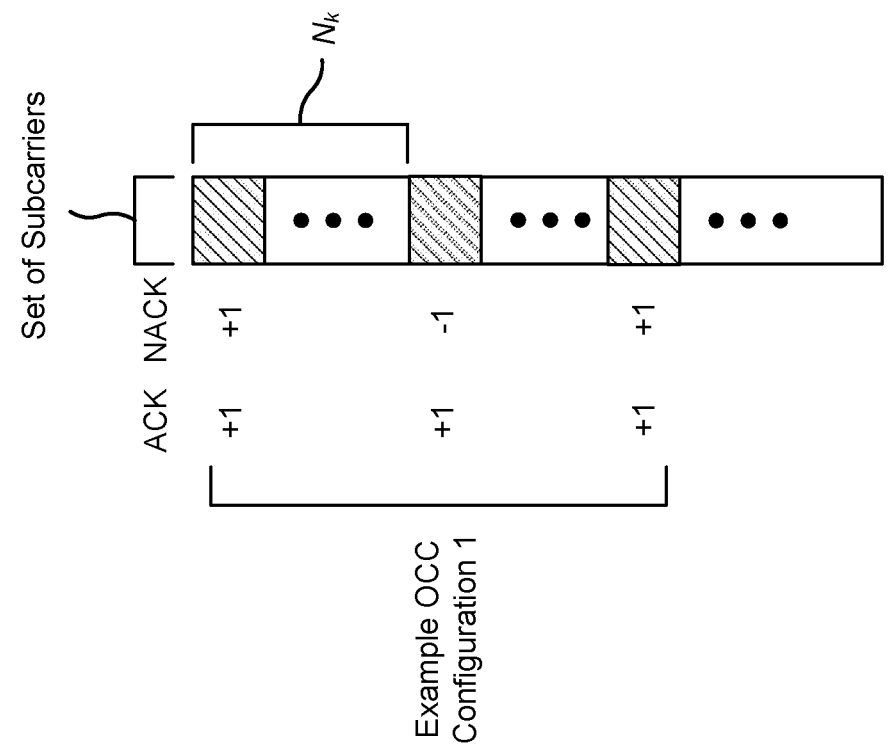

FIG. 4E illustrates various examples of OCCs or cyclic shifts that may be applied to a PN sequence that is to be transmitted in a set of subcarriers. Other OCC configurations or cyclic shifts may be used for PN sequences that are to be transmitted in sets of subcarriers. As shown in example OCC configuration 1 in FIG. 4E, where a set of subcarriers includes a plurality of non-contiguous subcarriers, a first OCC (e.g., [+1, −1]) may be applied across the plurality of subcarriers to indicate a NACK and a second (different) OCC (e.g., [+1, +1]) may be applied across the plurality of subcarriers to indicate an ACK. This type of OCC configuration may be referred to as a cyclic shift. As shown in example OCC configuration 2 in FIG. 4E, where a set of subcarriers includes a plurality of non-contiguous groups of contiguous subcarriers, a first OCC may be applied across the plurality of subcarriers to indicate a NACK (e.g., [+1, −1]) and a second (different) OCC (e.g., [+1, +1]) may be applied across the plurality of subcarriers to indicate an ACK.

In some aspects, UE1 may transmit, in the HARQ feedback occasion, a sequence that is generated to represent the HARQ feedback for each sidelink communication of the one or more sidelink communications. In some aspects, UE1 may transmit a sequence for the time duration of the HARQ feedback occasion. For example, if the HARQ feedback occasion is one symbol, UE1 may transmit the sequence for the symbol. As another example, if the HARQ feedback occasion spans a plurality of symbols, UE1 may transmit the sequence across the plurality of symbols (e.g., may transmit the sequence in each symbol of the plurality of symbols).

In some aspects, if the HARQ feedback occasion spans a plurality of symbols, UE1 may generate and transmit a plurality of sequences, that represent the HARQ feedback for a particular sidelink communication, in the plurality of symbols. In this case, each sequence of the plurality of sequences may include a different sequence (e.g., that is generated based at least in part on a different seed sequence, that is applied with a different OCC or cyclic shift, and/or the like). UE1 may transmit a different sequence in each symbol of the plurality of symbols. For example, a sequence may be generated from a seed sequence that is initialized based at least in part on symbol index of a symbol (e.g., in slot) in which the sequence is to be transmitted. In this case, each sequence may be different because the seed sequence used to generate each sequence is initialized with a different symbol index.

In some aspects, the transmission of HARQ feedback for a sidelink communication may be considered a separate feedback channel from HARQ feedback for other sidelink communications. In some aspects, the collective transmissions of HARQ feedback for the one or more sidelink communications may be considered as a feedback channel.

In this way, UE1 may receive one or more sidelink communications on a sidelink and from one or more other UEs (e.g., UE2 and/or other UEs). UE1 may transmit, to the one or more other UEs and on a sidelink, HARQ feedback for the one or more sidelink communications in a HARQ feedback occasion. Since UE1 may be permitted to provide HARQ feedback to a plurality of other UEs in the HARQ feedback occasion, the frequency bandwidth of the HARQ feedback occasion may be partitioned into sets of subcarriers. In some aspects, UE1 may use each set of subcarriers to transmit HARQ feedback for a respective sidelink communication. UE1 may use the techniques described herein to identify one or more sets of subcarriers of the HARQ feedback occasion for the HARQ feedback for the one or more sidelink communications. In this way, UE1 is capable of multiplexing HARQ feedback in the HARQ feedback occasion for the one or more sidelink communications.

As indicated above, FIGS. 4A-4E are provided as one or more examples. Other examples may differ from what is described with respect to FIGS. 4A-4E.

Figure 5:
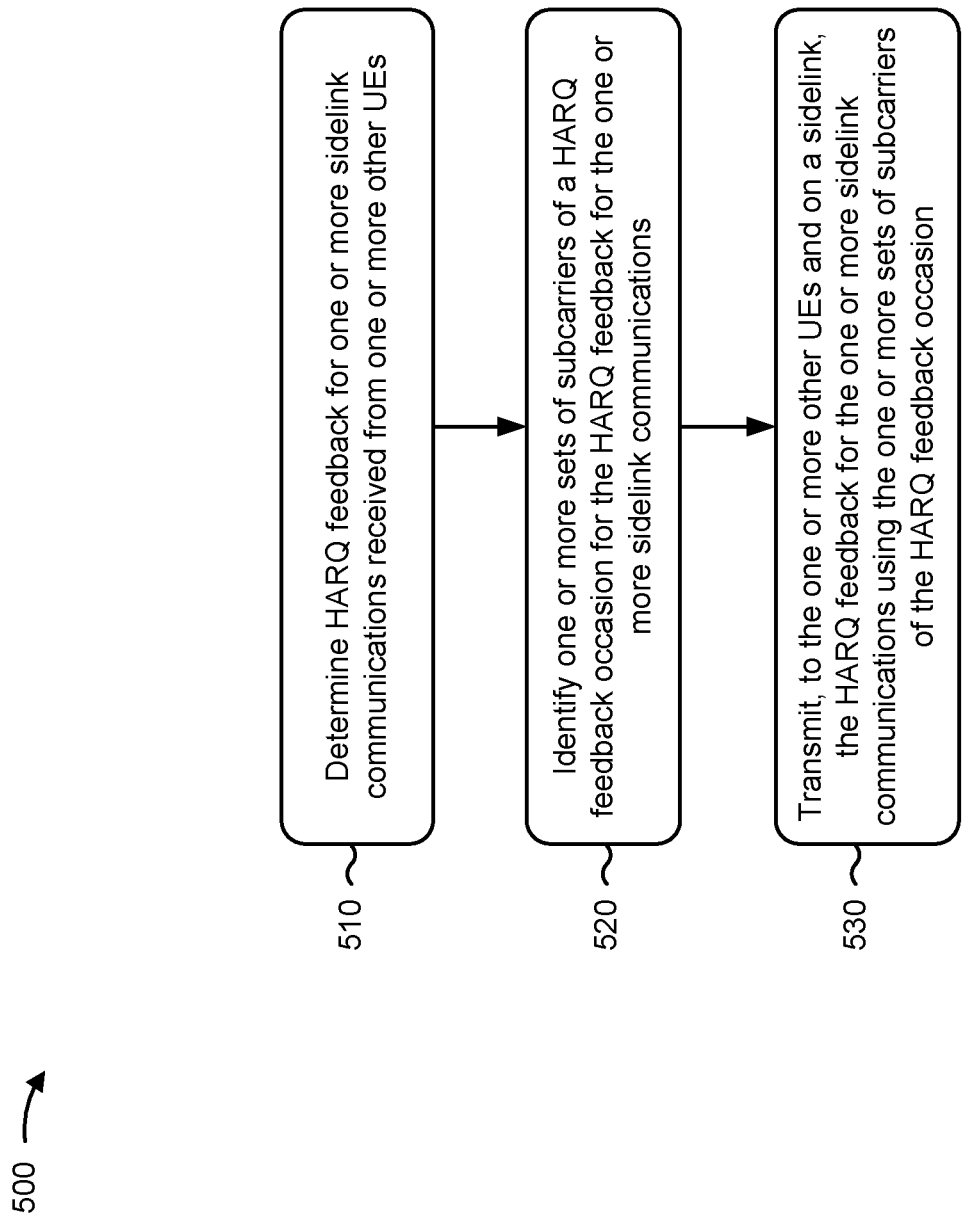
FIG. 5 is a diagram illustrating an example process performed, for example, by a UE, in accordance with various aspects of the present disclosure.

FIG. 5 is a diagram illustrating an example process 500 performed, for example, by a UE, in accordance with various aspects of the present disclosure. Example process 500 is an example where a UE (e.g., UE 120) performs operations associated with transmitting sidelink HARQ feedback.

As shown in FIG. 5, in some aspects, process 500 may include determining HARQ feedback for one or more sidelink communications received from one or more other UEs (block 510). For example, the UE (e.g., using receive processor 258, transmit processor 264, controller/processor 280, memory 282, and/or the like) may determine HARQ feedback for one or more sidelink communications received from one or more other UEs, as described above.

As further shown in FIG. 5, in some aspects, process 500 may include identifying one or more sets of subcarriers of a HARQ feedback occasion for the HARQ feedback for the one or more sidelink communications (block 520). For example, the UE (e.g., using receive processor 258, transmit processor 264, controller/processor 280, memory 282, and/or the like) may identify one or more sets of subcarriers of a HARQ feedback occasion for the HARQ feedback for the one or more sidelink communications, as described above.

As further shown in FIG. 5, in some aspects, process 500 may include transmitting, to the one or more other UEs and on a sidelink, the HARQ feedback for the one or more sidelink communications using the one or more sets of subcarriers of the HARQ feedback occasion (block 530). For example, the UE (e.g., using receive processor 258, transmit processor 264, controller/processor 280, memory 282, and/or the like) may transmit, to the one or more other UEs and on a sidelink, the HARQ feedback for the one or more sidelink communications using the one or more sets of subcarriers of the HARQ feedback occasion, as described above.

Process 500 may include additional aspects, such as any single aspect or any combination of aspects described below and/or in connection with one or more other processes described elsewhere herein.

In a first aspect, each set of subcarriers, of the one or more sets of subcarriers, is associated with a respective HARQ feedback for a sidelink communication of the HARQ feedback for the one or more sidelink communications, and each set of subcarriers, of the one or more sets of subcarriers, includes a plurality of subcarriers. In a second aspect, alone or in combination with the first aspect, the plurality of subcarriers are non-contiguous and evenly spaced apart across a bandwidth for the HARQ feedback occasion. In a third aspect, alone or in combination with one or more of the first and second aspects, the plurality of subcarriers are non-contiguous and each spaced apart by a particular number of subcarriers.

In a fourth aspect, alone or in combination with one or more of the first through third aspects, the plurality of subcarriers are non-contiguous and each spaced apart by a number of subcarriers, and the number of subcarriers is based at least in part on at least one of a subcarrier spacing of the sidelink, a bandwidth of the sidelink, a number of subchannels included in the bandwidth of the sidelink, a number of resource blocks included in the bandwidth of the sidelink, or a periodicity of HARQ feedback occasions for the sidelink. In a fifth aspect, alone or in combination with one or more of the first through fourth aspects, the plurality of subcarriers are non-contiguous, and a number of the one or more sets of subcarriers is based at least in part on a spacing between the plurality of subcarriers.

In a sixth aspect, alone or in combination with one or more of the first through fifth aspects, the plurality of subcarriers includes a plurality of non-contiguous groups of contiguous subcarriers. In a seventh aspect, alone or in combination with one or more of the first through sixth aspects, the plurality of non-contiguous groups are each spaced apart by a particular number of subcarriers. In an eighth aspect, alone or in combination with one or more of the first through seventh aspects, the plurality of non-contiguous groups are each spaced apart by a number of subcarriers, and the number of subcarriers is based at least in part on at least one of a subcarrier spacing of the sidelink, a bandwidth of the sidelink, a number of subchannels included in the bandwidth of the sidelink, a number of resource blocks included in the bandwidth of the sidelink, or a periodicity of HARQ feedback occasions for the sidelink.

In a ninth aspect, alone or in combination with one or more of the first through eighth aspects, a number of the one or more sets of subcarriers is based at least in part on a spacing between the plurality of non-contiguous groups of contiguous subcarriers. In a tenth aspect, alone or in combination with one or more of the first through ninth aspects, each set of subcarriers, of the one or more sets of subcarriers, is associated with a respective HARQ feedback for a sidelink communication of the HARQ feedback for the one or more sidelink communications, each set of subcarriers, of the one or more sets of subcarriers, includes an exclusive plurality of subcarriers, and the one or more sets of subcarriers are frequency division multiplexed. In an eleventh aspect, alone or in combination with one or more of the first through tenth aspects, transmitting the HARQ feedback for the one or more sidelink communications comprises transmitting one or more sequences that indicate the HARQ feedback for the one or more sidelink communications.

In a twelfth aspect, alone or in combination with one or more of the first through eleventh aspects, a length of the one or more sequences is based at least in part on at least one of a modulation order of one or more HARQ feedback communications for the HARQ feedback for the one or more sidelink communications, a bandwidth of the HARQ feedback occasion, a bandwidth of the one or more HARQ feedback communications, or a spacing between respective pluralities of subcarriers included in the one or more sets of subcarriers. In a thirteenth aspect, alone or in combination with one or more of the first through twelfth aspects, process 500 further comprises generating a sequence of the one or more sequences based at least in part on at least one of a UE identifier associated with another UE, of the one or more other UEs, that transmitted a sidelink communication, of the one or more sidelink communications, associated with the sequence, a sidelink channel resource identifier associated with the sidelink communication, a frame identifier associated with the sidelink communication, a slot number associated with the sidelink communication, or a symbol number associated with the sidelink communication.

In a fourteenth aspect, alone or in combination with one or more of the first through thirteenth aspects, process 500 further comprises modulating the one or more sequences based at least in part on a QAM modulation order. In a fifteenth aspect, alone or in combination with one or more of the first through fourteenth aspects, a time duration of the HARQ feedback occasion includes a plurality of symbols, and transmitting the one or more sequences comprises transmitting a sequence, of the one or more sequences, in each symbol of the plurality of symbols. In a sixteenth aspect, alone or in combination with one or more of the first through fifteenth aspects, transmitting the HARQ feedback for the one or more sidelink communications comprises transmitting a plurality of sequences that indicate a HARQ feedback for a sidelink communication of the one or more sidelink communications, a time duration of the HARQ feedback occasion includes a plurality of symbols, and transmitting the plurality of sequences that indicate the HARQ feedback for the sidelink communication comprises transmitting each sequence, of the plurality of sequences, in a respective symbol of the plurality of symbols, each sequence, of the plurality of sequences, being a different sequence of the plurality of sequences.

In a seventeenth aspect, alone or in combination with one or more of the first through sixteenth aspects, determining the HARQ feedback for the one or more sidelink communications comprises determining, for a sidelink communication of the one or more sidelink communications, whether to transmit a NACK. In an eighteenth aspect, alone or in combination with one or more of the first through seventeenth aspects, transmitting the one or more sequences that indicate the HARQ feedback for the one or more sidelink communications comprises transmitting a PN sequence, of the one or more sequences, that indicates the NACK. In a nineteenth aspect, alone or in combination with one or more of the first through eighteenth aspects, process 500 further comprises initializing a seed sequence based at least in part on determining to transmit the NACK and generating the PN sequence based at least in part on the seed sequence. In a twentieth aspect, alone or in combination with one or more of the first through nineteenth aspects, process 500 further comprises generating the PN sequence; and applying an OCC or cyclic shift that is based at least in part on determining to transmit the NACK or the ACK. In a twenty first aspect, alone or in combination with one or more of the first through twentieth aspects, determining the HARQ feedback for the one or more sidelink communications comprises determining, for a sidelink communication of the one or more sidelink communications, whether to transmit a NACK or an ACK. In a twenty second aspect, alone or in combination with one or more of the first through twenty first aspects, transmitting the one or more sequences that indicate the HARQ feedback for the one or more sidelink communications comprises transmitting a PN sequence, of the one or more sequences that indicates the NACK or the ACK.

In a twenty third aspect, alone or in combination with one or more of the first through twenty second aspects, process 500 further comprises initializing a seed sequence based at least in part on determining whether to transmit the NACK or the ACK, and generating the PN sequence based at least in part on the seed sequence. In a twenty fourth aspect, alone or in combination with one or more of the first through twenty third aspects, process 500 further comprises generating the PN sequence and applying an OCC or cyclic shift that is based at least in part on determining whether to transmit the NACK or the ACK.

In a twenty fifth aspect, alone or in combination with one or more of the first through twenty fourth aspects, process 500 further comprises generating the PN sequence based at least in part on a UE identifier associated with another UE, of the one or more other UEs, that transmitted the sidelink communication. In a twenty sixth aspect, alone or in combination with one or more of the first through twenty fifth aspects, transmitting the HARQ feedback for the one or more sidelink communications comprises transmitting the HARQ feedback for the one or more sidelink communications using a transmit power that is based at least in part on a number of HARQ feedback communications for the HARQ feedback for the one or more sidelink communications and a maximum number of HARQ feedback communications permitted to be transmitted in the HARQ feedback occasion.

In a twenty seventh aspect, alone or in combination with one or more of the first through twenty sixth aspects, process 500 further comprises identifying the HARQ feedback occasion from a plurality of periodic HARQ feedback occasions based at least in part on a time-domain resource location of the one or more sidelink communications, and a HARQ feedback delay parameter. In a twenty eighth aspect, alone or in combination with one or more of the first through twenty seventh aspects, identifying the one or more sets of subcarriers comprises identifying a set of subcarriers of the one or more sets of subcarriers based at least in part on a subchannel, of the sidelink, in which a sidelink communication of the one or more sidelink communications was transmitted.

In a twenty ninth aspect, alone or in combination with one or more of the first through twenty eighth aspects, a sidelink communication, of the one or more sidelink communications, is transmitted across a plurality of slots, and process 500 further comprises identifying the HARQ feedback occasion based at least in part on an ending slot of the plurality of slots, and identifying the one or more sets of subcarriers comprises identifying a set of subcarriers of the one or more sets of subcarriers based at least in part on a starting slot or an ending of the plurality of slots. In a thirtieth aspect, alone or in combination with one or more of the first through twenty ninth aspects, process 500 includes receiving the one or more sidelink communications using an unlicensed frequency spectrum, and wherein transmitting the HARQ feedback comprises transmitting the HARQ feedback using the unlicensed frequency spectrum.

Although FIG. 5 shows example blocks of process 500, in some aspects, process 500 may include additional blocks, fewer blocks, different blocks, or differently arranged blocks than those depicted in FIG. 5. Additionally, or alternatively, two or more of the blocks of process 500 may be performed in parallel.

Figure 6:
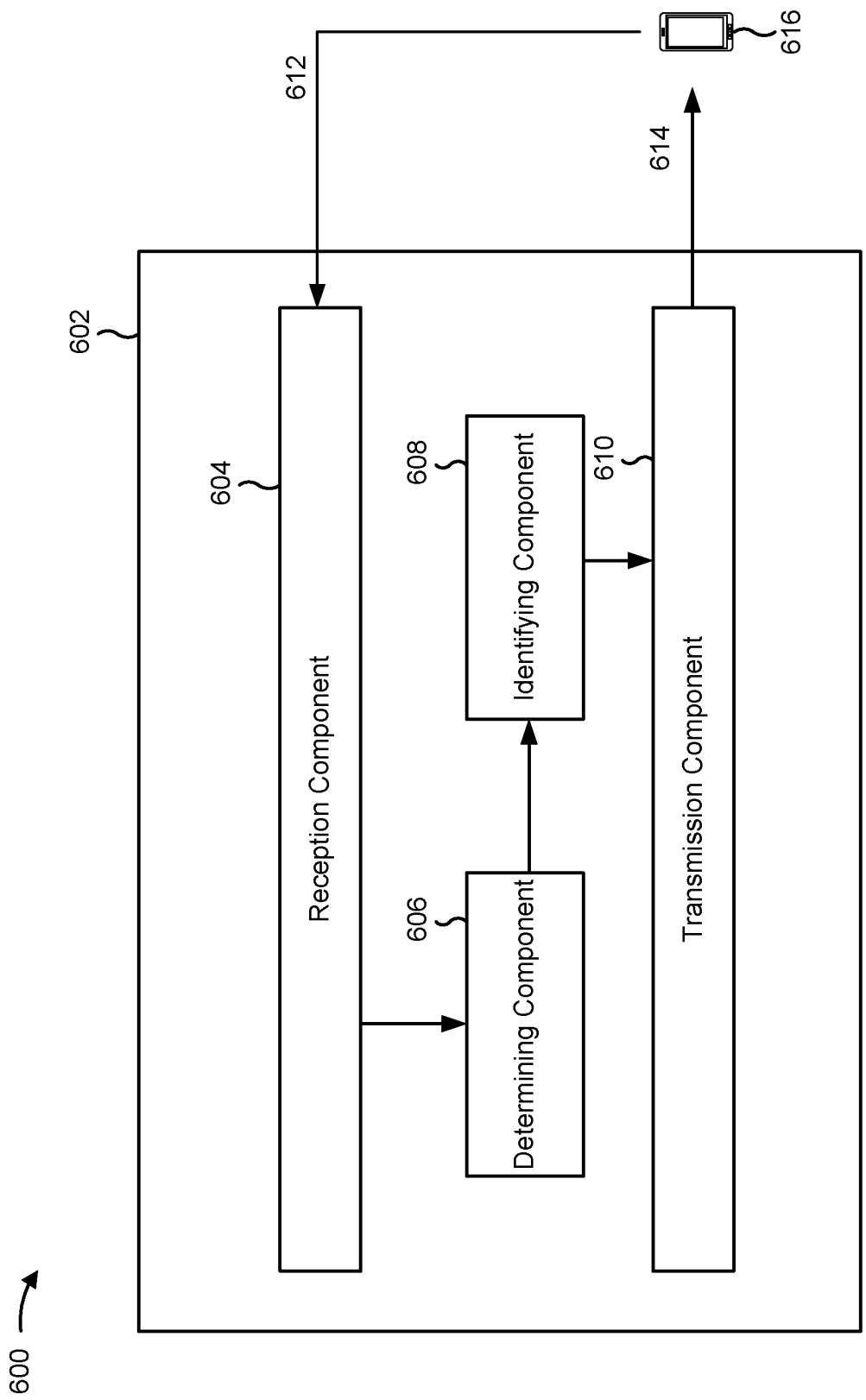
FIG. 6 is a conceptual data flow diagram illustrating data flows between different modules/means/components in an example apparatus, in accordance with various aspects of the present disclosure.

FIG. 6 is a conceptual data flow diagram 600 illustrating a data flow between different modules/means/components in an example apparatus 602. The apparatus 602 may be a UE (e.g., UE 120). In some aspects, the apparatus 602 includes a reception component 604, a determining component 606, an identifying component 608, and a transmission component 610.

Reception component 604 may receive one or more sidelink communications 612 from one or more UEs 616 (e.g., UE 120). For example, reception component 604 may receive one or more sidelink communications 612 on a sidelink. In some aspects, reception component 604 may include an antenna (e.g., antenna 252), a receive processor (e.g., receive processor 258), a controller/processor (e.g., controller/processor 280), a transceiver, a receiver, and/or the like.

Determining component 606 may determine HARQ feedback for one or more sidelink communications 612. For example, determining component 606 may determine whether to transmit an ACK or a NACK for each of sidelink communication 612. In some aspects, determining component 606 may include a processor (e.g., controller/processor 280, receive processor 258, and/or the like).

Identifying component 608 may identify one or more sets of subcarriers of a HARQ feedback occasion for the HARQ feedback for one or more sidelink communications 612. For example, identifying component 608 may identify a set of subcarriers, included in the HARQ feedback occasion, for each of sidelink communication 612. In some aspects, identifying component 608 may include a processor (e.g., controller/processor 280, receive processor 258, and/or the like).

Transmission component 610 may transmit, to one or more other UEs 616 and on a sidelink, the HARQ feedback for the one or more sidelink communications 612 using the one or more sets of subcarriers of the HARQ feedback occasion. For example, transmission component 610 may transmit the HARQ feedback in one or more HARQ feedback communications 614. In some aspects, transmission component 610 may include an antenna (e.g., antenna 252), a transmit processor (e.g., transmit processor 264), a controller/processor (e.g., controller/processor 280), a transceiver, a transmitter, and/or the like.

Apparatus 602 may include additional components that perform each of the blocks of the algorithm in the aforementioned process 500 of FIG. 5 and/or the like. Each block in the aforementioned process 500 of FIG. 5 and/or the like may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

The number and arrangement of components shown in FIG. 6 are provided as an example. In practice, there may be additional components, fewer components, different components, or differently arranged components than those shown in FIG. 6. Furthermore, two or more components shown in FIG. 6 may be implemented within a single component, or a single component shown in FIG. 6 may be implemented as multiple, distributed components. Additionally, or alternatively, a set of components (e.g., one or more components) shown in FIG. 6 may perform one or more functions described as being performed by another set of components shown in FIG. 6.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
    determining hybrid automatic repeat request (HARQ) feedback for a plurality of sidelink communications received from a plurality of other UEs;
    identifying a plurality of sets of subcarriers of a HARQ feedback occasion for the HARQ feedback for the plurality of sidelink communications; and
    transmitting, to the plurality of other UEs and on a sidelink, the HARQ feedback for the plurality of sidelink communications using the plurality of sets of subcarriers and using a transmit power,
        wherein each set of subcarriers, of the plurality of sets of subcarriers, is used to transmit a respective HARQ feedback for a sidelink communication of the HARQ feedback for the plurality of sidelink communications, and
        wherein the transmit power is based at least in part on a quantity of HARQ feedback communications for the HARQ feedback for the plurality of sidelink communications.

2. The method of claim 1, wherein each set of subcarriers, of the plurality of sets of subcarriers, includes a plurality of subcarriers.

3. The method of claim 2, wherein the plurality of subcarriers are non-contiguous and evenly spaced apart across a bandwidth for the HARQ feedback occasion.

4. The method of claim 2, wherein the plurality of subcarriers are non-contiguous and each spaced apart by a quantity of subcarriers,
wherein the quantity of subcarriers is based at least in part on at least one of:
a subcarrier spacing of the sidelink,
a bandwidth of the sidelink,
a quantity of subchannels included in the bandwidth of the sidelink,
a quantity of resource blocks included in the bandwidth of the sidelink, or
a periodicity of HARQ feedback occasions for the sidelink.

5. The method of claim 2, wherein the plurality of subcarriers are non-contiguous; and
wherein a quantity of the plurality of sets of subcarriers is based at least in part on a spacing between the plurality of subcarriers.

6. The method of claim 2, wherein the plurality of subcarriers includes a plurality of non-contiguous groups of contiguous subcarriers.

7. The method of claim 6, wherein the plurality of non-contiguous groups are each spaced apart by a particular quantity of subcarriers.

8. The method of claim 6, wherein the plurality of non-contiguous groups are each spaced apart by a quantity of subcarriers,
wherein the quantity of subcarriers is based at least in part on at least one of:
a subcarrier spacing of the sidelink,
a bandwidth of the sidelink,
a quantity of subchannels included in the bandwidth of the sidelink,
a quantity of resource blocks included in the bandwidth of the sidelink, or
a periodicity of HARQ feedback occasions for the sidelink.

9. The method of claim 6, wherein a quantity of the plurality of sets of subcarriers is based at least in part on a spacing between the plurality of non-contiguous groups of contiguous subcarriers.

10. The method of claim 1, further comprising:
receiving the plurality of sidelink communications using an unlicensed frequency spectrum; and
wherein transmitting the HARQ feedback comprises:
transmitting the HARQ feedback using the unlicensed frequency spectrum.

11. A user equipment (UE) for wireless communication, comprising:
a memory; and
one or more processors coupled to the memory, the one or more processors configured to:
determine hybrid automatic repeat request (HARQ) feedback for a plurality of sidelink communications received from a plurality of other UEs;
identify a plurality of sets of subcarriers of a HARQ feedback occasion for the HARQ feedback for the plurality of sidelink communications; and
transmit, to the plurality of other UEs and on a sidelink, the HARQ feedback for the plurality of sidelink communications using the plurality of sets of subcarriers and using a transmit power,
wherein each set of subcarriers, of the plurality of sets of subcarriers, is used to transmit a respective HARQ feedback for a sidelink communication of the HARQ feedback for the plurality of sidelink communications, and
wherein the transmit power is based at least in part on a quantity of HARQ feedback communications for the HARQ feedback for the plurality of sidelink communications.

12. The UE of claim 11, wherein the one or more processors, when transmitting the HARQ feedback for the plurality of sidelink communications, are configured to:
transmit one or more sequences that indicate the HARQ feedback for the plurality of sidelink communications.

13. The UE of claim 12, wherein a length of the one or more sequences is based at least in part on at least one of:
a modulation order of one or more HARQ feedback communications for the HARQ feedback for the plurality of sidelink communications,
a bandwidth of the HARQ feedback occasion for the plurality of sidelink communications,
a bandwidth of the one or more HARQ feedback communications, or
a spacing between respective pluralities of subcarriers included in the plurality of sets of subcarriers.

14. The UE of claim 12, wherein the one or more processors are further configured to:
generate a sequence of the one or more sequences based at least in part on at least one of:
a UE identifier associated with another UE, of the plurality of other UEs, that transmitted a sidelink communication, of the plurality of sidelink communications, associated with the sequence,
a sidelink channel resource identifier associated with the sidelink communication associated with the sequence,
a frame identifier associated with the sidelink communication associated with the sequence,
a slot number associated with the sidelink communication associated with the sequence, or
a symbol number associated with the sidelink communication associated with the sequence.

15. The UE of claim 12, wherein the one or more processors are further configured to:
modulate the one or more sequences based at least in part on a quadrature amplitude modulation (QAM) modulation order.

16. The UE of claim 12, wherein a time duration of the HARQ feedback occasion includes a plurality of symbols; and
wherein the one or more processors, when transmitting the one or more sequences, are configured to:
transmit a sequence, of the one or more sequences, in each symbol of the plurality of symbols.

17. The UE of claim 12, wherein the one or more processors, when transmitting the HARQ feedback for the plurality of sidelink communications, are configured to:
transmit a plurality of sequences that indicate a HARQ feedback for a particular sidelink communication of the plurality of sidelink communications;
wherein a time duration of the HARQ feedback occasion includes a plurality of symbols; and
wherein the one or more processors, when transmitting the plurality of sequences that indicate the HARQ feedback for the particular sidelink communication, are configured to:
transmit each sequence, of the plurality of sequences, in a respective symbol of the plurality of symbols,
wherein each sequence, of the plurality of sequences, is a different sequence of the plurality of sequences.

18. The UE of claim 12, wherein the one or more processors, when determining the HARQ feedback for the plurality of sidelink communications, are configured to:
determine, for a sidelink communication of the plurality of sidelink communications, whether to transmit a negative acknowledgement (NACK).

19. The UE of claim 18, wherein the one or more processors, when transmitting the one or more sequences that indicate the HARQ feedback for the plurality of sidelink communications, are configured to:
initialize a seed sequence based at least in part on determining to transmit the NACK;
generate a pseudorandom noise (PN) sequence based at least in part on the seed sequence; and
transmit the PN sequence to indicate the NACK.

20. The UE of claim 19, wherein the one or more processors are further configured to:
generate the PN sequence; and
apply an orthogonal cover code (OCC) or cyclic shift that is based at least in part on determining to transmit the NACK.

21. The UE of claim 12, wherein the one or more processors, when determining the HARQ feedback for the plurality of sidelink communications, are configured to:
determine, for a sidelink communication of the plurality of sidelink communications, whether to transmit a negative acknowledgement (NACK) or an acknowledgement (ACK).

22. The UE of claim 21, wherein the one or more processors, when transmitting the one or more sequences that indicate the HARQ feedback for the plurality of sidelink communications, are configured to:
initialize a seed sequence based at least in part on determining whether to transmit the NACK or the ACK;
generate a pseudorandom noise (PN) sequence based at least in part on the seed sequence; and
transmit the PN sequence to indicate the NACK or the ACK.

23. The UE of claim 22, wherein the one or more processors are further configured to:
generate the PN sequence; and
apply an orthogonal cover code (OCC) or cyclic shift that is based at least in part on determining whether to transmit the NACK or the ACK.

24. A non-transitory computer-readable medium storing one or more instructions for wireless communication, the one or more instructions comprising:
one or more instructions that, when executed by one or more processors of a user equipment (UE), cause the UE to:
determine hybrid automatic repeat request (HARQ) feedback for a plurality of sidelink communications received from a plurality of other UEs;
identify a plurality of sets of subcarriers of a HARQ feedback occasion for the HARQ feedback for the plurality of sidelink communications; and
transmit, to the plurality of other UEs and on a sidelink, the HARQ feedback for the plurality of sidelink communications using the plurality of sets of subcarriers and using a transmit power,
wherein each set of subcarriers, of the plurality of sets of subcarriers, is used to transmit a respective HARQ feedback for a sidelink communication of the HARQ feedback for the plurality of sidelink communications, and
wherein the transmit power is based at least in part on a quantity of HARQ feedback communications for the HARQ feedback for the plurality of sidelink communications.

25. The non-transitory computer-readable medium of claim 24, wherein each set of subcarriers, of the plurality of sets of subcarriers, includes an exclusive plurality of subcarriers; and
wherein the plurality of sets of subcarriers are frequency division multiplexed.

26. The non-transitory computer-readable medium of claim 24, wherein the a transmit power is based at least in part on a maximum quantity of HARQ feedback communications permitted to be transmitted in the HARQ feedback occasion.

27. The non-transitory computer-readable medium of claim 24, wherein the one or more instructions further cause the UE to:
identify the HARQ feedback occasion from a plurality of periodic HARQ feedback occasions based at least in part on:
a time-domain resource location of the plurality of sidelink communications, and
a HARQ feedback delay parameter.

28. An apparatus for wireless communication, comprising:
means for determining hybrid automatic repeat request (HARQ) feedback for a plurality of sidelink communications received from a plurality of other apparatuses;
means for identifying a plurality of sets of subcarriers of a HARQ feedback occasion for the HARQ feedback for the plurality of sidelink communications; and
means for transmitting, to the plurality of other apparatuses and on a sidelink, the HARQ feedback for the plurality of sidelink communications using the plurality of sets of subcarriers and using a transmit power,
wherein each set of subcarriers, of the plurality of sets of subcarriers, is used to transmit a respective HARQ feedback for a sidelink communication of the HARQ feedback for the plurality of sidelink communications, and
wherein the transmit power is based at least in part on a quantity of HARQ feedback communications for the HARQ feedback for the plurality of sidelink communications.

29. The apparatus of claim 28, wherein the means for identifying the plurality of sets of subcarriers comprises:
means for identifying a set of subcarriers of the plurality of sets of subcarriers based at least in part on a subchannel, of the sidelink, in which a particular sidelink communication of the plurality of sidelink communications was transmitted.

30. The apparatus of claim 28, wherein a particular sidelink communication, of the plurality of sidelink communications, is transmitted across a plurality of slots;
wherein the apparatus further comprises:
means for identifying the HARQ feedback occasion based at least in part on an ending slot of the plurality of slots; and
wherein the means for identifying the plurality of sets of subcarriers comprises:
means for identifying a set of subcarriers of the plurality of sets of subcarriers based at least in part on a starting slot or an ending slot of the plurality of slots.

* * * * *